(12) United States Patent
Kawamoto et al.

(10) Patent No.: US 12,305,044 B2
(45) Date of Patent: May 20, 2025

(54) IMAGE RECORDED MATERIAL AND IMAGE RECORDING METHOD

(71) Applicant: FUJIFILM CORPORATION, Tokyo (JP)

(72) Inventors: Takuma Kawamoto, Kanagawa (JP); Misato Sasada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/646,790

(22) Filed: Apr. 26, 2024

(65) Prior Publication Data

US 2024/0318018 A1    Sep. 26, 2024

Related U.S. Application Data

(63) Continuation of application No. PCT/JP2022/041962, filed on Nov. 10, 2022.

(30) Foreign Application Priority Data

Nov. 12, 2021 (JP) .................................. 2021-185021
Jun. 6, 2022 (JP) .................................. 2022-091690

(51) Int. Cl.
*B32B 3/10* (2006.01)
*B41M 7/00* (2006.01)
(Continued)

(52) U.S. Cl.
CPC .......... *C09D 11/101* (2013.01); *B41M 7/0081* (2013.01); *C09D 11/38* (2013.01); *C09K 19/3852* (2013.01)

(58) Field of Classification Search
CPC ........... B32B 3/10; C09D 11/30; C09D 11/38; C09D 11/101
See application file for complete search history.

(56) References Cited

U.S. PATENT DOCUMENTS

2019/0196245 A1   6/2019   Ichihara et al.
2020/0183214 A1   6/2020   Katoh

FOREIGN PATENT DOCUMENTS

WO   2018/043678 A1   3/2018
WO   2019/035449 A1   2/2019
WO   WO 2021/059879   *   4/2021

OTHER PUBLICATIONS

International Search Report issued in International Application No. PCT/JP2022/041962 on Jan. 31, 2023.
(Continued)

*Primary Examiner* — Elizabeth E Mulvaney
(74) *Attorney, Agent, or Firm* — SOLARIS Intellectual Property Group, PLLC

(57) ABSTRACT

Provided are an image recorded material including a substrate and an image recorded on the substrate, in which the image includes a cholesteric liquid crystal layer, the cholesteric liquid crystal layer has a stripe pattern of a bright portion and a dark portion, observed by a scanning electron microscope, in a cross section along a thickness direction of the image, in a case where an angle between a continuous line which is the bright portion or the dark portion and a main surface of the substrate is defined as an alignment angle, at least two regions in which an absolute value of a difference of the alignment angles is 5° or more are provided, and both of the two regions have a length of width of 1 mm or more in an in-plane direction of the substrate; and applications thereof.

7 Claims, 3 Drawing Sheets

(51) Int. Cl.
*C09D 11/101* (2014.01)
*C09D 11/38* (2014.01)
*C09K 19/38* (2006.01)

(56) References Cited

OTHER PUBLICATIONS

Written Opinion of the ISA issued in International Application No. PCT/JP2022/041962 on Jan. 31, 2023.
Partial Supplementary European Search Report dated Jan. 2, 2025, issued in corresponding EP Patent Application No. 22892868.5.
Extended European Search Report dated Mar. 24, 2025, issued in corresponding EP Patent Application No. 22892868.5.

* cited by examiner

IMAGE RECORDED MATERIAL AND IMAGE RECORDING METHOD

CROSS-REFERENCE TO RELATED APPLICATIONS

This application is a Continuation of International Application No. PCT/JP2022/041962, filed Nov. 10, 2022, which claims priority to Japanese Patent Application No. 2021-185021, filed Nov. 12, 2021, and Japanese Patent Application No. 2022-091690, filed Jun. 6, 2022. Each of the above applications is hereby expressly incorporated by reference, in its entirety, into the present application.

BACKGROUND OF THE INVENTION

1. Field of the Invention

The present disclosure relates to an image recorded material and an image recording method.

2. Description of the Related Art

In recent years, an image recording method using an ink containing a liquid crystal compound has been proposed. Cholesteric liquid crystals prepared by adding a chiral agent to the liquid crystal compound have unique light reflectivity and have characteristics in that tone changes depending on the viewing angle. In a case where the ink containing a liquid crystal compound is used, it is possible to record a special image which cannot be obtained in other image recording materials. Therefore, such an ink is expected to be applied to special decorations for articles such as packaging materials and security printing.

For example, WO2018/043678A discloses a decorative sheet including a cholesteric liquid crystal layer having wavelength-selective reflectivity, in which the cholesteric liquid crystal layer has a stripe pattern of a bright portion and a dark portion in a cross section observed by a scanning electron microscope, the stripe pattern has a waving structure, and an average value of peak-to-peak distances of the waving structure is 0.5 µm to 50 µm.

SUMMARY OF THE INVENTION

In some cases, an image in which a stereoscopic effect is obtained by changing a viewing angle may be required depending on the application.

The present disclosure has been made in view of such circumstances, and according to an embodiment of the present invention, there are provided an image recorded material and an image recording method, in which a stereoscopic effect is obtained.

The present disclosure includes the following aspects.

<1>
An image recorded material comprising:
a substrate; and
an image recorded on the substrate,
wherein the image includes a cholesteric liquid crystal layer,
wherein the cholesteric liquid crystal layer has a stripe pattern of a bright portion and a dark portion, observed by a scanning electron microscope, in a cross-section along a thickness direction of the image,
wherein, in a case in which an angle between a continuous line, which is the bright portion or the dark portion, and a main surface of the substrate is defined as an alignment angle, at least two regions in which an absolute value of a difference of alignment angles is 5° or more are provided, and
wherein each of the at least two regions has a length of width of 1 mm or more in an in-plane direction of the substrate.

<2>
The image recorded material according to <1>,
in which the alignment angle is −5° to 5° in at least a part of the cholesteric liquid crystal layer.

<3>
The image recorded material according to <1> or <2>,
in which at least one region of the at least two regions has a length of width of 1 mm to 40 mm in the in-plane direction of the substrate.

<4>
The image recorded material according to any one of <1> to <3>,
in which the image includes a region in which a difference of film thicknesses within a range of a length of width of 40 mm in the in-plane direction of the substrate is 0.5 µm or more.

<5>
The image recorded material according to any one of <1> to <4>,
in which the image includes a region in which a difference of film thicknesses within a range of a length of width of 10 mm in the in-plane direction of the substrate is 1 µm to 30 µm.

<6>
The image recorded material according to any one of <1> to <5>,
in which the image has a selective reflection wavelength of 460 nm or more.

<7>
The image recorded material according to any one of <1> to <6>,
in which other image including no cholesteric liquid crystal layer is further disposed between the substrate and the image or on the image on the substrate.

<8>
An image recording method comprising:
a step of applying an ink containing a polymerizable liquid crystal compound, a chiral compound, and a solvent onto a substrate by an ink jet recording method; and
a step of irradiating the ink applied onto the substrate with an active energy ray to record an image which is a cured film of the ink,
in which, in the step of applying the ink, the ink is applied under a condition that a difference of film thicknesses of the image to be recorded within a range of a length of width of 40 mm in an in-plane direction of the substrate is 0.5 µm or more.

<9>
The image recording method according to <8>,
in which the solvent includes a solvent having a boiling point of 100° C. or higher and lower than 300° C.

<10>
The image recording method according to <8> or <9>, further comprising:
a step of heating the substrate to 45° C. or higher,
in which, in the step of applying the ink, the ink is applied onto the heated substrate.

<11>

The image recording method according to any one of <8> to <10>, further comprising, after the step of applying the ink and before the step of irradiating the ink with the active energy ray:

a step of heating the ink applied onto the substrate, in which, in the step of heating the ink, a content of the solvent in the ink after the heating is 50% by mass or less with respect to a content of the solvent immediately before a timing of applying the ink.

According to the embodiment of the present invention, there are provided an image recorded material and an image recording method, in which a stereoscopic effect is obtained.

DESCRIPTION OF THE PREFERRED EMBODIMENTS

Figure 1:
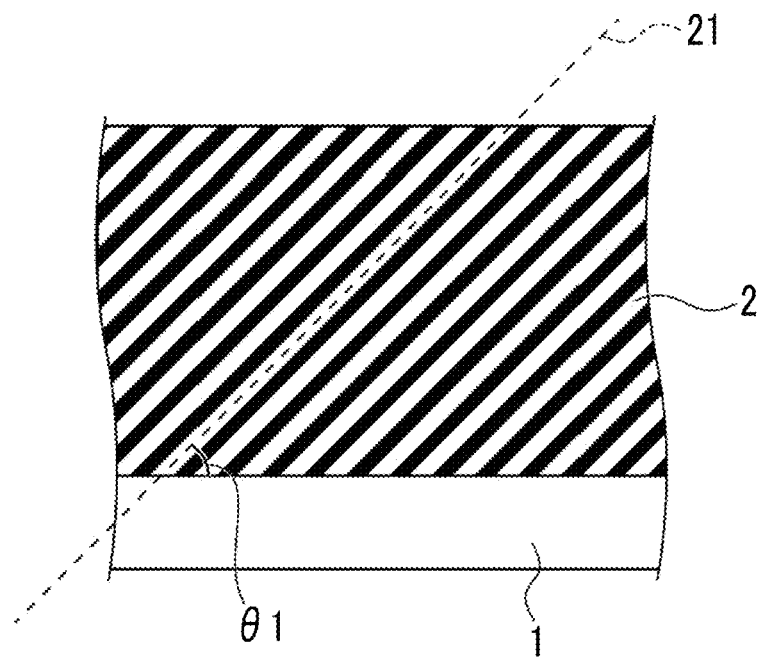
FIG. 1 is a schematic view showing a stripe pattern of a bright portion and a dark portion, observed by a cross-sectional SEM of an image recorded material, and is a view for describing an alignment angle.

Hereinafter, the image recorded material and the image recording method according to the present disclosure will be described in detail.

In the present specification, a numerical range indicated using "to" means a range including numerical values described before and after "to" as a minimum value and a maximum value, respectively.

In a numerical range described in a stepwise manner in the present specification, an upper limit or a lower limit described in a certain numerical range may be replaced with an upper limit or a lower limit in another numerical range described in a stepwise manner. In addition, in a numerical range described in the present specification, an upper limit or a lower limit described in a certain numerical range may be replaced with a value described in Examples.

In the present specification, in a case in which a plurality of substances corresponding to respective components in a composition are present, the amount of the respective components in the composition means the total amount of the plurality of substances present in the composition unless otherwise specified.

In addition, in the present specification, a combination of two or more preferred aspects is a more preferred aspect.

Furthermore, in the present specification, the meaning of the term "step" includes not only an independent step but also a step whose intended purpose is achieved even in a case in which the step is not clearly distinguished from other steps.

[Image Recorded Material]

The image recorded material according to the present disclosure includes a substrate and an image recorded on the substrate, in which the image includes a cholesteric liquid crystal layer, the cholesteric liquid crystal layer has a stripe pattern of a bright portion and a dark portion, observed by a scanning electron microscope, in a cross section along a thickness direction of the image, in a case where an angle between a continuous line which is the bright portion or the dark portion and a main surface of the substrate is defined as an alignment angle, at least two regions in which an absolute value of a difference of the alignment angles is 5° or more are provided, and both of the two regions have a length of width of 1 mm or more in an in-plane direction of the substrate.

According to the present disclosure, in the stripe pattern observed by the SEM of the image in the cross section, there are two regions in which the absolute value of the difference of the alignment angles is 5° or more, and the width of each region is 1 mm or more, so that the image may appear to have a shadow in a part of the image depending on an angle at which the image recorded material is viewed. Due to the presence of the shadow, the image which is macroscopically flat can be visually recognized as being three-dimensional.

In particular, in a case where an image recorded on a transparent substrate is observed with a background color set to black, a remarkable stereoscopic effect is obtained. In a case where the observation is performed with a background color set to white, a portion where glossiness is remarkable is generated depending on the angle, and the stereoscopic effect is obtained by appearing to shine locally. In addition, even in a case where the background color is other than white or black, the stereoscopic effect can be obtained in the same manner.

On the other hand, in WO2018/043678A, it is disclosed that a stripe pattern observed by an SEM of an image in a cross section has a waving structure, an average value of peak-to-peak distances of the waving structure is 0.5 µm to 50 µm, and the stripe pattern exhibits high lustrousness even in a case of being observed from a direction away from a specular reflection of illumination light, and the stereoscopic effect is not considered.

Hereinafter, each configuration of the image recorded material according to the present disclosure will be described in detail.

<Substrate>

The image recorded material according to the present disclosure includes a substrate.

The substrate is not particularly limited, and any substrate can be selected. The substrate may be any of an ink-absorbing substrate, a substrate having low ink absorbency, and a non-ink-absorbing substrate. Examples of the substrate include paper, leather, fabric, and a resin. Among these, as the substrate, from the viewpoint of color developability, a non-ink-absorbing substrate is preferable, and a resin substrate is more preferable.

Examples of a resin constituting the resin substrate include cellulose diacetate, cellulose triacetate, cellulose propionate, cellulose butyrate, cellulose acetate butyrate, cellulose nitrate, an acrylic resin, a chlorinated polyolefin resin, a polyether sulfone resin, polyethylene terephthalate (PET), polyethylene naphthalate, nylon, polyethylene, polystyrene, polypropylene, a polycycloolefin resin, a polyimide resin, a polycarbonate resin, and polyvinyl acetal. The resin substrate may be a substrate containing only one of these resins, or may be a substrate prepared by mixing two or more resins among the above. In addition, other layers such as an easy adhesion layer, an antistatic layer, and an antifouling layer may be formed on these resins, or a surface of the substrate may be subjected to a hydrophilic treatment.

A thickness of the substrate is not particularly limited, but is, for example, 1 µm to 10 mm.

<Image>

The image recorded material according to the present disclosure includes an image recorded on the substrate. The image includes a cholesteric liquid crystal layer, the cholesteric liquid crystal layer has a stripe pattern of a bright portion and a dark portion, observed by an SEM, in a cross section along a thickness direction of the image, in a case where an angle between a continuous line which is the bright portion or the dark portion and a main surface of the substrate is defined as an alignment angle, at least two regions in which an absolute value of a difference of the alignment angles is 5° or more are provided, and both of the two regions have a length of width of 1 mm or more in an in-plane direction of the substrate.

The cholesteric liquid crystal layer refers to a layer including at least a cholesteric liquid crystalline phase. The cholesteric liquid crystalline phase means a phase in which liquid crystal molecules are helically aligned. In a case of the cholesteric liquid crystal layer, a stripe pattern of a bright portion and a dark portion is observed by the SEM.

The stripe pattern of the bright portion and the dark portion, observed by the SEM, can be confirmed, for example, by the following method.

The image is cut in a thickness direction of the image to obtain a cross-sectional sample. A cross-sectional SEM image is observed with a scanning electron microscope (acceleration voltage: 2 kV, observation magnification: 5,000 times and 10,000 times). It can be confirmed that there is a stripe pattern of light and shade due to a change in refractive index of the cholesteric liquid crystalline phase.

In the present disclosure, in the stripe pattern of light and shade, a black portion is referred to as the dark portion and a white portion is referred to as the bright portion.

In the cross-sectional SEM image, one period of the bright portion and the dark portion corresponds to 180 degrees of a helix of the liquid crystal. Therefore, two periods of the bright portion and the dark portion correspond to 360 degrees of the helix of the liquid crystal. That is, a width of the two periods of the bright portion and the dark portion corresponds to a length of a helical pitch in the cholesteric liquid crystal layer.

In addition, a normal direction of the continuous line which is the bright portion or the dark portion means a direction of a helical axis in the cholesteric liquid crystal layer.

In the present disclosure, an angle between the continuous line which is the bright portion or the dark portion and the main surface of the substrate is defined as an alignment angle. The main surface of the substrate refers to a surface of the substrate, having the largest area. In a case where the alignment angle is 0°, that is, in a case where the continuous line and the main surface of the substrate are parallel to each other, the cholesteric liquid crystal layer exhibits specular reflectivity.

A method of measuring the alignment angle will be described with reference to FIG. 1.

FIG. 1 is a schematic view showing a stripe pattern of a bright portion and a dark portion, observed by a cross-sectional SEM of an image recorded material in which an image 2 is recorded on a substrate 1, and is a view for describing the alignment angle. For example, as shown in FIG. 1, a straight line 21 is drawn along the continuous line of the dark portion. As the alignment angle, an angle θ1 between a main surface 11 of the substrate and the straight line 21 is measured.

The alignment angle is represented by a plus in a case where the straight line is upwardly inclined (that is, has a positive inclination in the X-Y coordinates), and is represented by a minus in a case where the straight line is downwardly inclined (that is, has a negative inclination in the X-Y coordinates). Therefore, in FIG. 1, the angle θ1 is represented by a plus.

Next, a method of confirming a change in alignment angle in the cross section of the image recorded material and specifying two regions in which an absolute value of a difference of the alignment angles is 5° or more in the image recorded material will be described with reference to FIG. 2.

Figure 2:
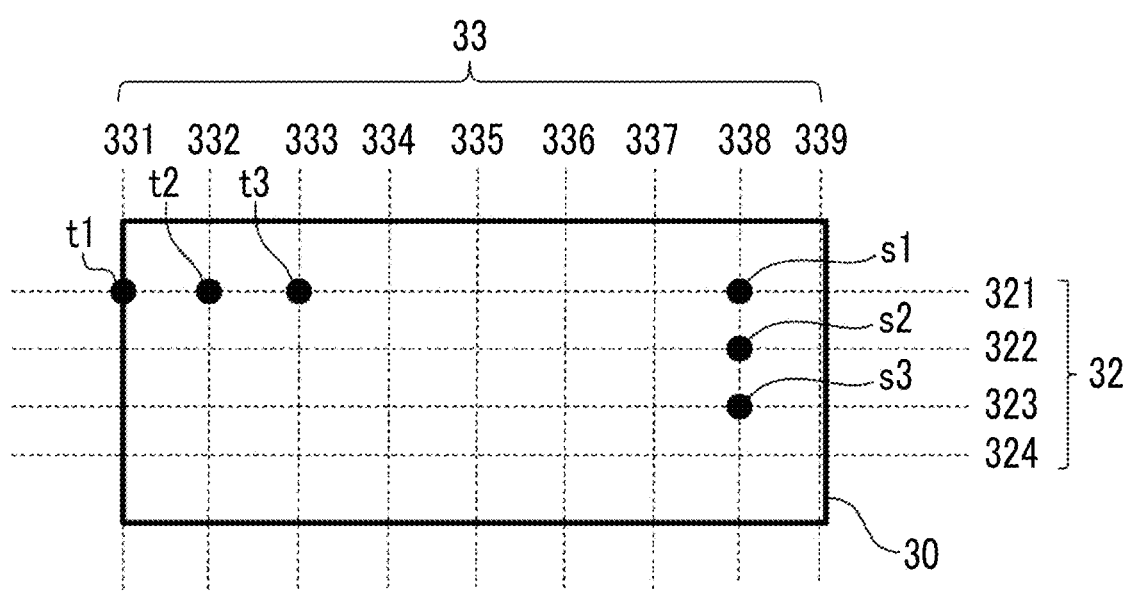
FIG. 2 is a view for describing a method of confirming a change in alignment angle.

FIG. 2 is a view for describing the method of confirming the change in alignment angle.

First, as shown in FIG. 2, imaginary lines in two directions orthogonal to each other are drawn in an image recorded material 30. Specifically, a first imaginary line 32 (in FIG. 2, first imaginary lines 321 to 324) is drawn at any position of the image recorded material 30. In addition, a second imaginary line 33 (in FIG. 2, second imaginary lines 331 to 339) orthogonal to the first imaginary line is drawn. The first imaginary lines 321 and 324 are parallel to each other, and the second imaginary lines 331 to 339 are parallel to each other. The number of the first imaginary lines and the number of the second imaginary lines are not particularly limited.

It is sufficient that the direction of the first imaginary line and the direction of the second imaginary line are orthogonal to each other, and it is not particularly limited. In a case where the image recorded material is an image recorded material having a difference of film thicknesses, it is preferable that the direction of the first imaginary line and the direction of the second imaginary line are a direction parallel to a direction in which the film thickness changes and a direction orthogonal to the direction in which the film thickness changes, respectively. The direction in which the film thickness changes can be confirmed by visually observing the image recorded material having a difference of film thicknesses. Examples of the "film thickness changes" include an aspect in which the film thickness is increased in any direction and an aspect in which the film thickness is decreased in any direction. In addition, the film thickness may be changed in the entire image recorded material, or the film thickness may be changed in a part of the image recorded material.

In order to confirm the change in alignment angle in the cross section of the image recorded material, an alignment angle at an intersection between the first imaginary line and the second imaginary line in the cross section obtained by cutting along the first imaginary line is measured according to the above-described method of measuring the alignment angle.

Intersections t1, t2, and t3 shown in FIG. 2 are intersections between the first imaginary line 321 and the second imaginary lines 331, 332, and 333 in the cross section obtained by cutting along the first imaginary line 321.

Similarly, in the cross section obtained by cutting along the second imaginary line, an alignment angle at an intersection between the first imaginary line and the second imaginary line is measured according to the above-described method of measuring the alignment angle.

Intersections s1, s2, and s3 shown in FIG. 2 are intersections between the second imaginary line 338 and the first imaginary lines 321, 322, and 323 in the cross section obtained by cutting along the second imaginary line 338.

Alignment angles at all the intersections to be measured are measured. In a case of measuring the alignment angle, a plurality of parallel cross sections obtained by cutting are observed from a predetermined one direction. In the measurement result of the alignment angle at each intersection, an alignment angle of a larger absolute value, among alignment angles in the cross section obtained by cutting along the first imaginary line and alignment angles in the cross section obtained by cutting along the second imaginary line, is adopted.

By comparing the adopted alignment angles, a change direction of the alignment angles can be determined. A length in a direction in which the alignment angle is changed is defined as a length of width of two regions in which the absolute value of the difference of the alignment angles is 5° or more in the present disclosure.

Examples of the change in alignment angle include an aspect in which the change in alignment angle can be confirmed in the cross section obtained by cutting along the first imaginary line and an aspect in which the change in alignment angle can be confirmed in the cross section obtained by cutting along the second imaginary line. Hereinafter, a method of specifying the two regions in which the absolute value of the difference of the alignment angles is 5° or more in the above-described two aspects will be described using an image recorded material having a difference of film thicknesses.

Figure 3A:
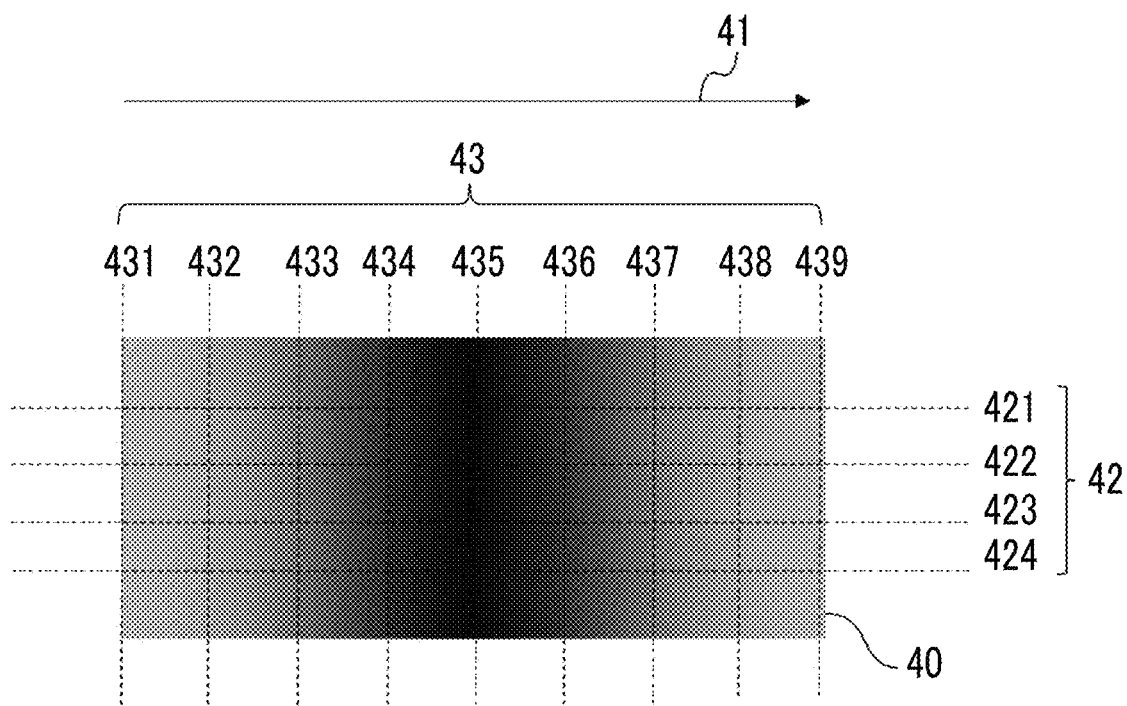
FIG. 3A is a schematic view of an image recorded material in which a film thickness is changed, as viewed from above.

FIG. 3A shows an aspect in which the change in alignment angle can be confirmed in the cross section cut along the first imaginary line of FIG. 2, by using an image recorded material 40 having a difference of film thicknesses. The image recorded material shown in FIG. 3A is an example of an image recorded material obtained by performing image recording using image data shown in FIG. 4A, which will be described later.

In FIG. 3A, an arrow 41 indicates a direction in which the film thickness changes. In FIG. 3A, the film thickness gradually increases from a left side of the image recorded material in a direction of the arrow 41, the film thickness is the largest in a center portion of the image recorded material, and the film thickness gradually decreases from the center portion in the direction of the arrow 41.

In order to confirm the change in alignment angle in the cross section of the image recorded material, first, an imaginary parallel line 42 (421 to 424) parallel to the direction of the arrow 41 and an imaginary orthogonal line 43 (431 to 439) orthogonal to the direction of the arrow 41 are drawn. An alignment angle at each intersection is measured. In FIG. 3A, the alignment angle is measured by observing the cross section from the left side of the paper plane in FIG. 3A.

For example, in a cross section obtained by cutting along the imaginary parallel lines 421 to 424, the alignment angles at each intersection are all 0°.

On the other hand, for example, in a cross section obtained by cutting along the imaginary orthogonal line 431, an alignment angle at an intersection between the imaginary parallel line 421 and the imaginary orthogonal line 431 is −15°;

in a cross section obtained by cutting along the imaginary orthogonal line 432, an alignment angle at an intersection between the imaginary parallel line 421 and the imaginary orthogonal line 432 is −8°;

in a cross section obtained by cutting along the imaginary orthogonal line 433, an alignment angle at an intersection between the imaginary parallel line 421 and the imaginary orthogonal line 433 is −5°;

in a cross section obtained by cutting along the imaginary orthogonal line 434, an alignment angle at an intersection between the imaginary parallel line 421 and the imaginary orthogonal line 434 is −2.5°;

in a cross section obtained by cutting along the imaginary orthogonal line 435, an alignment angle at an intersection between the imaginary parallel line 421 and the imaginary orthogonal line 435 is 0°;

in a cross section obtained by cutting along the imaginary orthogonal line 436, an alignment angle at an intersection between the imaginary parallel line 421 and the imaginary orthogonal line 436 is 2.5°;

in a cross section obtained by cutting along the imaginary orthogonal line 437, an alignment angle at an intersection between the imaginary parallel line 421 and the imaginary orthogonal line 437 is −5°;

in a cross section obtained by cutting along the imaginary orthogonal line 438, an alignment angle at an intersection between the imaginary parallel line 421 and the imaginary orthogonal line 438 is 8°; and in a cross section obtained by cutting along the imaginary orthogonal line 439, an alignment angle at an intersection between the imaginary parallel line 421 and the imaginary orthogonal line 439 is 15°.

In the cross section obtained by cutting along the imaginary orthogonal line 431, an alignment angle at an intersection of the imaginary parallel line 422 and the imaginary orthogonal line 431 is also −15°, an alignment angle at an intersection of the imaginary parallel line 423 and the imaginary orthogonal line 431 is also −15°, and an alignment angle at an intersection of the imaginary parallel line 424 and the imaginary orthogonal line 431 is also −15°. That is, in the cross section obtained by cutting along the imaginary orthogonal line 431, the alignment angle is substantially constant. Similarly, in each cross section obtained by cutting along the imaginary orthogonal lines 432, 433, 434, 435, 436, 437, 438, and 439, the alignment angles are substantially constant. In the above-described specific description of the alignment angle, the "imaginary parallel line 421" can be read as the imaginary parallel line 422, the imaginary parallel line 423, or the imaginary parallel line 424.

In this case, an alignment angle in a cross section obtained by cutting along an imaginary orthogonal line, which is a cross section having a largest absolute value of the alignment angle, is adopted.

In addition, in this case, it can be seen that the alignment angle changes in the direction of the arrow 41. A length in a direction in which the alignment angle changes is defined as a length of width of two regions in which the absolute value of the difference of the alignment angles is 5° or more in the present disclosure.

In the above-described example, the alignment angles in the region from the imaginary orthogonal line 431 to the imaginary orthogonal line 434 are −15° to −2.5°, and the alignment angles in the region from the imaginary orthogonal line 436 to the imaginary orthogonal line 439 are 2.5° to 15°.

As a result, for example, it is determined whether or not the distance from the imaginary orthogonal line 431 to the imaginary orthogonal line 434 and the distance from the imaginary orthogonal line 436 to the imaginary orthogonal line 439 are both 1 mm or more.

In a case where both of the above-described distances are 1 mm or more, the image recorded material is an image recorded material in which at least two regions in which the absolute value of the difference of the alignment angles is 5° or more are provided, and both of the two regions satisfy that the length of width in the in-plane direction of the substrate is 1 mm or more.

In a case where the distance between the imaginary orthogonal line 431 and the imaginary orthogonal line 434 and the distance between the imaginary orthogonal line 436 and the imaginary orthogonal line 439 are 1 mm or more, a region between the imaginary orthogonal line 431 and the imaginary orthogonal line 434 and a region between the imaginary orthogonal line 436 and the imaginary orthogonal line 439 correspond to the above-described two regions.

The upper limit value of the absolute value of the difference of the alignment angles is not particularly limited, but is, for example, 25°. In addition, the upper limit value of the length of width of the two regions in which the absolute value of the difference of the alignment angles is 5° or more is not particularly limited, but is, for example, 40 mm.

Figure 3B:
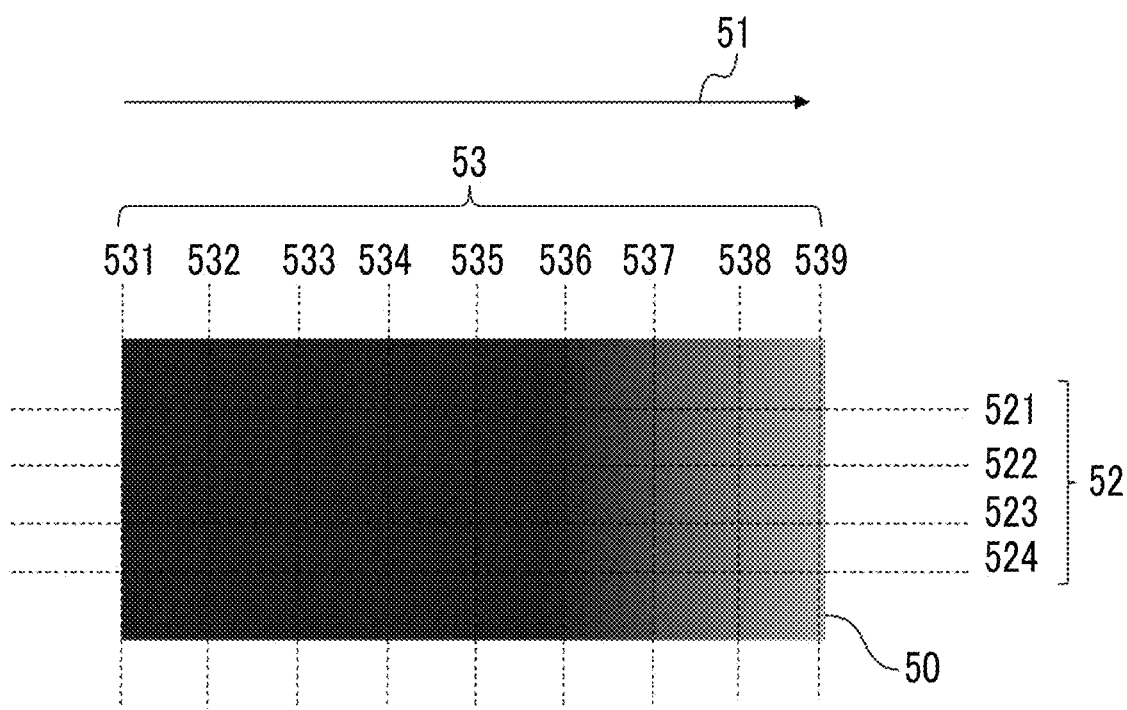
FIG. 3B is a schematic view of the image recorded material in which the film thickness is changed, as viewed from above.

FIG. 3B shows an aspect in which the change in alignment angle can be confirmed in the cross section cut along the second imaginary line of FIG. 2, by using an image recorded material 50 having a difference of film thicknesses. The image recorded material shown in FIG. 3B is an example of an image recorded material obtained by performing image recording using image data shown in FIG. 4B, which will be described later.

Figure 4A:
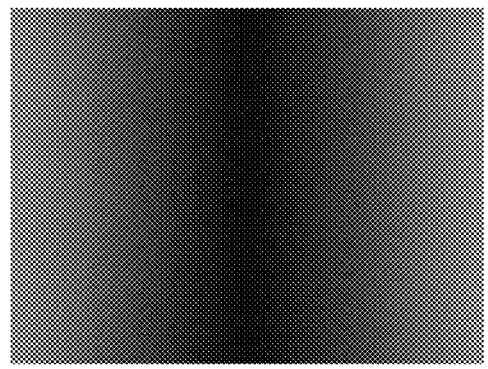
FIG. 4A is an example of image data in which a printing rate is continuously changed with a portion having a high printing rate as a center.
Figure 4B:
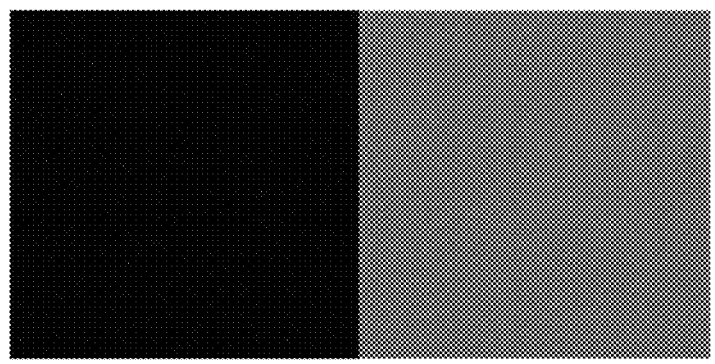
FIG. 4B is an example of image data in which solid images having different printing rates are arranged adjacent to each other.

In a case where the image data shown in FIG. 4B is used, the ink film tends to be formed smoothly at boundary portions where printing rates are different from each other. Therefore, a portion where the film thickness continuously changes is present in the image.

In FIG. 3B, an arrow 51 indicates a direction in which the film thickness changes. In the image recorded material 50 shown in FIG. 3B, a region sandwiched between an imaginary orthogonal line 531 and an imaginary orthogonal line 533, and a region sandwiched between an imaginary orthogonal line 537 and an imaginary orthogonal line 539, which will be described below, have substantially the same film thickness, and a region sandwiched between an imaginary orthogonal line 533 and an imaginary orthogonal line 537, which will be described below, has a film thickness which gradually decreases in the direction of the arrow 51.

In order to confirm the change in alignment angle in the cross section of the image recorded material, first, an imaginary parallel line 52 (521 to 524) and an imaginary orthogonal line 53 (531 to 539) are drawn. An alignment angle at each intersection is measured. In FIG. 3B, the alignment angle is measured by observing the cross section from the lower side of the paper plane in FIG. 3B.

For example, in a cross section obtained by cutting along the imaginary orthogonal lines 531 to 539, the alignment angles at each intersection are all 0°.

On the other hand, for example, in a cross section obtained by cutting along the imaginary parallel line 521, an alignment angle at an intersection between the imaginary parallel line 521 and the imaginary orthogonal line 531 is 0°;
an alignment angle at an intersection between the imaginary parallel line 521 and the imaginary orthogonal line 532 is 0°;
an alignment angle at an intersection between the imaginary parallel line 521 and the imaginary orthogonal line 533 is 0°;
an alignment angle at an intersection between the imaginary parallel line 521 and the imaginary orthogonal line 534 is −7°;
an alignment angle at an intersection between the imaginary parallel line 521 and the imaginary orthogonal line 535 is −10°;
an alignment angle at an intersection between the imaginary parallel line 521 and the imaginary orthogonal line 536 is −7°;
an alignment angle at an intersection between the imaginary parallel line 521 and the imaginary orthogonal line 537 is 0°;
an alignment angle at an intersection between the imaginary parallel line 521 and the imaginary orthogonal line 538 is 0°; and an alignment angle at an intersection between the imaginary parallel line 521 and the imaginary orthogonal line 539 is 0°.

In the cross section obtained by cutting along the imaginary parallel line 522, alignment angles at each intersection between the imaginary parallel line 522 and the imaginary orthogonal lines 531, 532, 533, 534, 535, 536, 537, 538, and 539 are 0°, 0°, 0°, −7°, −10°, −7°, 0°, 0°, and 0°, respectively. The alignment angle in the cross section obtained by cutting along the imaginary parallel line 521 and the alignment angle in the cross section obtained by cutting along the imaginary parallel lines 522, 523, and 534 are substantially constant on the same imaginary orthogonal line. In the above-described specific description of the alignment angle, the "imaginary parallel line 521" can be read as the imaginary parallel line 522, the imaginary parallel line 523, or the imaginary parallel line 524.

In this case, an alignment angle in a cross section obtained by cutting along an imaginary parallel line, which is a cross section having a largest absolute value of the alignment angle, is adopted.

In addition, in this case, it can be seen that the alignment angle changes in the direction of the arrow 51. A length in a direction in which the alignment angle changes is defined as a length of width of two regions in which the absolute value of the difference of the alignment angles is 5° or more in the present disclosure.

Focusing on the change in alignment angle, in the above-described example, the alignment angles in the region from the imaginary orthogonal line 531 to the imaginary orthogonal line 533 are 0°, and the alignment angles in the region from the imaginary orthogonal line 534 to the imaginary orthogonal line 536 are −10° to 7°.

As a result, for example, it is determined whether or not the distance from the imaginary orthogonal line 531 to the imaginary orthogonal line 533 and the distance from the imaginary orthogonal line 534 to the imaginary orthogonal line 536 are both 1 mm or more.

In a case where both of the above-described distances are 1 mm or more, the image recorded material is an image recorded material in which at least two regions in which the absolute value of the difference of the alignment angles is 5° or more are provided, and both of the two regions satisfy that the length of width in the in-plane direction of the substrate is 1 mm or more.

In a case where the distance between the imaginary orthogonal line 531 and the imaginary orthogonal line 533 and the distance between the imaginary orthogonal line 534 and the imaginary orthogonal line 536 are 1 mm or more, a region between the imaginary orthogonal line 531 and the imaginary orthogonal line 533 and a region between the imaginary orthogonal line 534 and the imaginary orthogonal line 536 correspond to the above-described two regions.

In the above-described example, in a case where the alignment angle in the region between the imaginary orthogonal line 537 and the imaginary orthogonal line 539 is 0° and the distance between the imaginary orthogonal line 537 and the imaginary orthogonal line 539 is 1 mm or more, a region between the imaginary orthogonal line 537 and the imaginary orthogonal line 539 and a region between the imaginary orthogonal line 534 and the imaginary orthogonal line 536 may correspond to the above-described two regions.

As long as at least two regions in which the absolute value of the difference of the alignment angles is 5° or more are provided and the length of width of the two regions is 1 mm or more, the two regions may be provided in at least a part of the image recorded material according to the present disclosure. That is, it may be determined whether or not the above-described two regions are provided in a part of the image recorded material. In a case of the image recorded material 50 shown in FIG. 3B, focusing on the change in alignment angle, it is possible to confirm whether or not the above-described two regions are provided only in the region between the imaginary orthogonal line 531 and the imaginary orthogonal line 536.

In the image recorded material according to the present disclosure, the cholesteric liquid crystal layer includes at least two regions in which the absolute value of the difference of the alignment angles is 5° or more, and the length of width of both of the two regions in the in-plane direction of the substrate is 1 mm or more. The image recorded material according to the present disclosure may include a region other than the at least two regions described above.

Among these, from the viewpoint of further exhibiting the stereoscopic effect, it is preferable that a distance between the two regions in which the absolute value of the difference of the alignment angles is 5° or more is small. Hereinafter, in a case where there is a plurality of combinations of the two regions in which the absolute value of the difference of the alignment angles is 5° or more, regions with the smallest distance of the two regions are referred to as a region 1 and a region 2, respectively.

From the viewpoint of further exhibiting the stereoscopic effect, a distance between the region 1 and the region 2 is preferably 5 mm or less, more preferably 1 mm or less, and still more preferably 0.5 mm or less.

The absolute value of the alignment angle of the region 1 and the region 2 is preferably 0° to 25° and more preferably 0° to 15°. In addition, an aspect in which the alignment angle of one of the region 1 and the region 2 is −25° to −2.5° and the alignment angle of the other of the region 1 and the region 2 is 2.5° to 25°, or an aspect in which the absolute value of the alignment angle of one of the region 1 and the region 2 is 3° or less and the absolute value of the alignment angle of the other of the region 1 and the region 2 is 8° or more is more preferable.

The alignment angle in at least a part of the cholesteric liquid crystal layer is preferably −5° to 5° and more preferably −1° to 1°. That is, it is preferable that the cholesteric liquid crystal layer includes a region having an alignment angle of −5° to 5°. In a case where the cholesteric liquid crystal layer includes a region having a horizontal alignment (that is, having an alignment angle of 0°) or a region close to the horizontal alignment, and includes a region having a high alignment angle in a region adjacent to the region, the stereoscopic effect is more remarkably obtained.

Both of the two regions in which the absolute value of the difference of the alignment angles is 5° or more have a length of width of 1 mm or more in the in-plane direction of the substrate, and from the viewpoint of further exhibiting the stereoscopic effect, it is preferable that at least one region of the two regions has a length of width of 1 mm to 40 mm in the in-plane direction of the substrate. In addition, from the viewpoint of further exhibiting the stereoscopic effect, it is more preferable that the length of width of at least one region of the above-described two regions in the in-plane direction of the substrate is 1 mm to 5 mm.

In particular, in at least one of the region 1 or the region 2, the length of width in the in-plane direction of the substrate is preferably 1 mm to 40 mm and more preferably 1 mm to 5 mm.

In the image recorded material according to the present disclosure, it is preferable that the image includes a region in which a difference of film thicknesses within a range of a length of width of 40 mm in the in-plane direction of the substrate is 0.5 µm or more. The difference of film thicknesses is more preferably 1 µm or more. The upper limit value of the difference of film thicknesses is not particularly limited, but is, for example, 30 µm. In addition, it is more preferable that the image includes a region in which a difference of film thicknesses within a range of a length of width of 10 mm in the in-plane direction of the substrate is 1 µm to 30 µm. The difference of film thicknesses is still more preferably 1 µm to 10 µm.

The difference of film thicknesses means a value obtained by subtracting a thickness of a portion of the image having the thickest film thickness (that is, the maximum thickness) from a thickness of the image having the thinnest film thickness (that is, the minimum thickness).

The film thickness of the image is measured by the following method.

The image recorded material is cut along the thickness direction of the image to obtain a cross section of the image. The cross section of the image is observed with a scanning electron microscope (acceleration voltage: 2 kV, observation magnification: 5,000 times and 10,000 times) to measure the film thickness of the image.

In the image recorded material according to the present disclosure, from the viewpoint of further exhibiting the stereoscopic effect, it is more preferable that the image has a selective reflection wavelength of 460 nm or more.

The selective reflection wavelength is calculated by measuring a spectral reflectance with a fluorescence spectral densitometer. For example, the selective reflection wavelength is calculated using a fluorescence spectral densitometer (product name "FD-7", manufactured by Konica Minolta, Inc.). In the measurement, a black paper of a covering ratio measurement paper (standard: JIS K 5600, manufactured by TP Giken Co., Ltd.) is placed under the substrate, and the color is measured by setting the image on the outermost layer.

In the image recorded material according to the present disclosure, it is preferable that other image including no cholesteric liquid crystal layer is further disposed between the substrate and the image or on the image on the substrate. The other images may or may not contain a coloring material. In a case where an image not containing a coloring material is disposed between the substrate and the image, or on the image on the substrate, it is possible to impart a special designability by a combination of a difference in texture, such as the glossiness, and a background color, while maintaining the stereoscopic effect obtained in the present disclosure including the cholesteric liquid crystal layer. In addition, in a case where an image containing a coloring material is disposed on the image on the substrate, the substrate preferably has a transmittance of 30% or more with respect to light having a wavelength of 600 nm. The image can also be visually recognized from the substrate side.

[Image Recording Method]

The image recording method according to the present disclosure includes a step of applying an ink containing a polymerizable liquid crystal compound, a chiral compound, and a solvent onto a substrate by an ink jet recording method (hereinafter, also referred to as "ink applying step"), and a step of irradiating the ink applied onto the substrate with an active energy ray to record an image which is a cured film of the ink (hereinafter, also referred to as "active energy ray irradiating step"). In the ink applying step, the ink is applied under a condition that a difference of film thicknesses of the image to be recorded within a range of a length of width of 40 mm in an in-plane direction of the substrate is 0.5 μm or more.

Hereinafter, each step in the image recording method according to the present disclosure will be described.

<Ink Applying Step>

In the ink applying step, an ink containing a polymerizable liquid crystal compound, a chiral compound, and a solvent is applied onto a substrate by an ink jet recording method.

The ink to be applied in the ink applying step may be only one kind or two or more kinds. In a case of applying two or more kinds of inks, the types and the contents of the polymerizable liquid crystal compound, the chiral compound, and the solvent contained in each ink may be the same or different from each other.

(Polymerizable Liquid Crystal Compound)

In the present disclosure, the polymerizable liquid crystal compound refers to a liquid crystal compound having a polymerizable group.

The liquid crystal compound may be a rod-like liquid crystal compound or a disk-like liquid crystal compound, but is preferably a rod-like liquid crystal compound.

Examples of the rod-like liquid crystal compound include a rod-like nematic liquid crystal compound. As the rod-like nematic liquid crystal compound, an azomethine compound, an azoxy compound, a cyano biphenyl compound, a cyanophenyl ester compound, benzoic acid ester, cyclohexane carboxylic acid phenyl ester, a cyanophenyl cyclohexane compound, a cyano-substituted phenyl pyrimidine compound, an alkoxy-substituted phenyl pyrimidine compound, a phenyl dioxane compound, a tolane compound, or an alkenylcyclohexylbenzonitrile compound is preferably used. As the rod-like liquid crystal compound, not only a low-molecular-weight liquid crystal compound but also a high-molecular-weight liquid crystal compound can be used.

The polymerizable liquid crystal compound is obtained by introducing a polymerizable group into the liquid crystal compound. Examples of the polymerizable group include a polymerizable unsaturated group, an epoxy group, and an aziridinyl group. Among these, as the polymerizable group, a polymerizable unsaturated group is preferable, and an ethylenically unsaturated group is particularly preferable. The number of polymerizable groups included in the polymerizable liquid crystal compound is preferably 1 to 6 and more preferably 1 to 3. From the viewpoint of the durability of the image to be obtained, the polymerizable liquid crystal compound more preferably has two polymerizable groups in a molecule.

Examples of the polymerizable liquid crystal compound include compounds described in "Makromol. Chem., vol. 190, p. 2255 (1989), Advanced Materials, vol. 5, p. 107 (1993)", U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), JP2001-328973A, and the like.

Specific examples of the polymerizable liquid crystal compound include the following compounds (1) to (17). The polymerizable liquid crystal compound is not limited to the following examples.

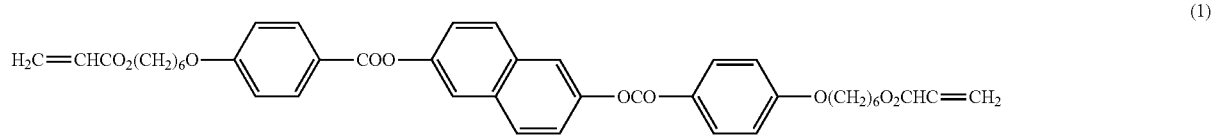

(1)

(3)

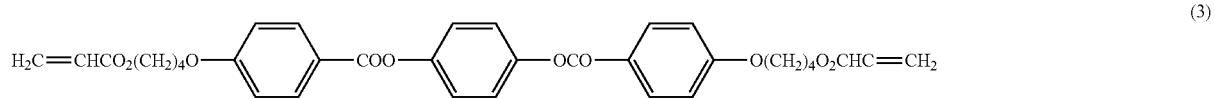

(4)

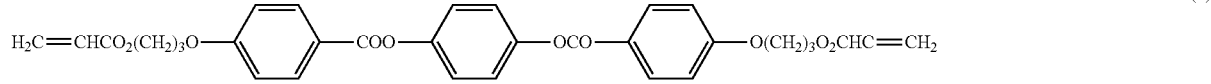

(5)

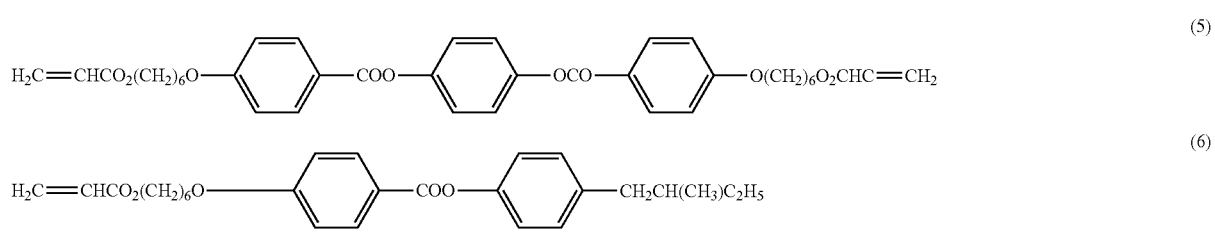

(6)

-continued
(7)
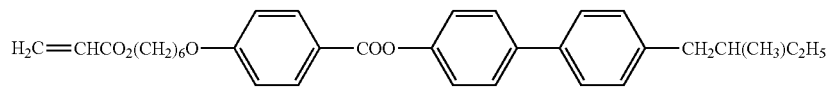
(8)
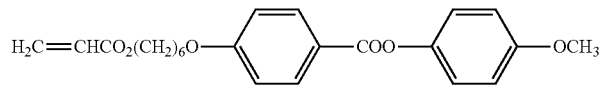
(9)
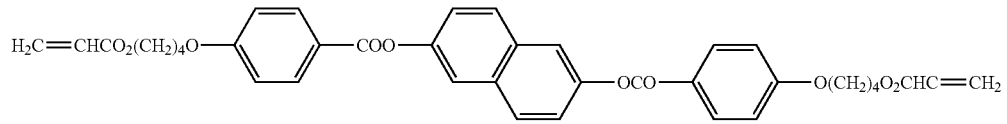
(10)
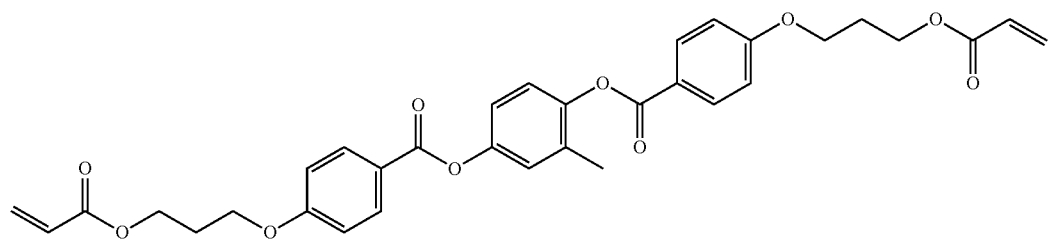
(11)
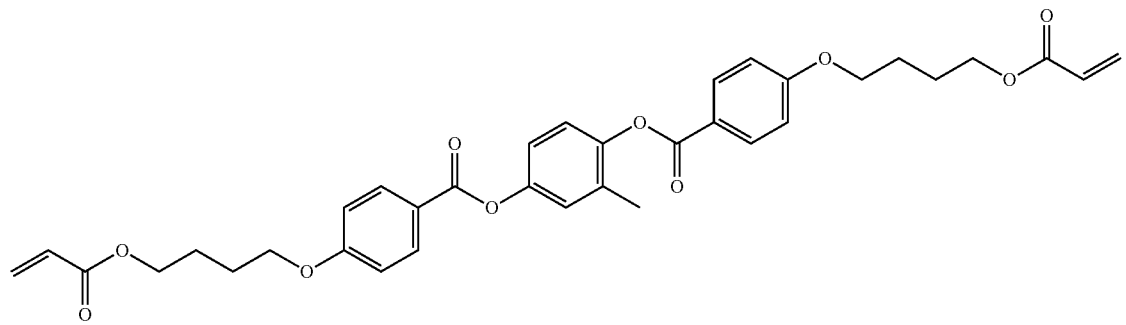
(12)
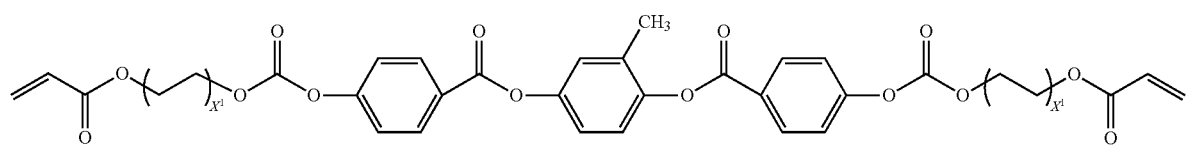
In the compound (12), $X^1$'s each independently represent an integer of 2 to 5.
(13)
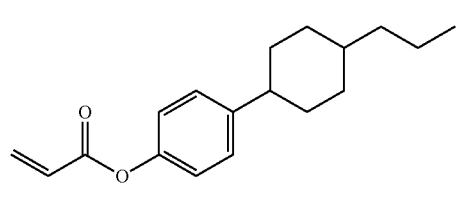
(14)
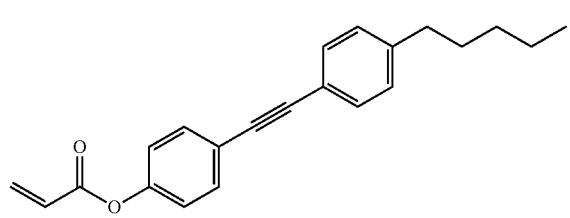

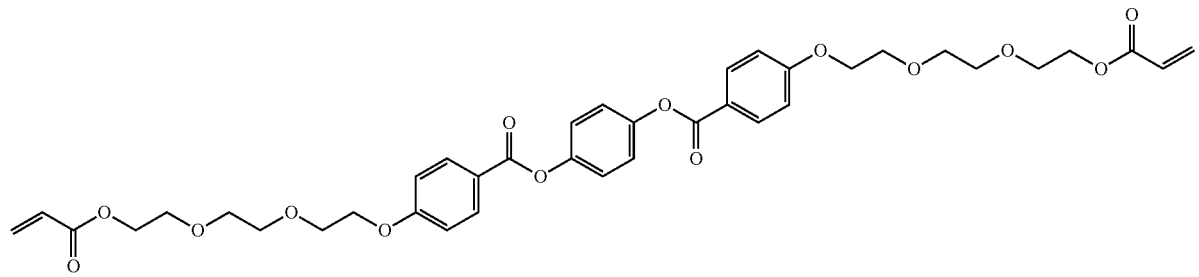

(15)

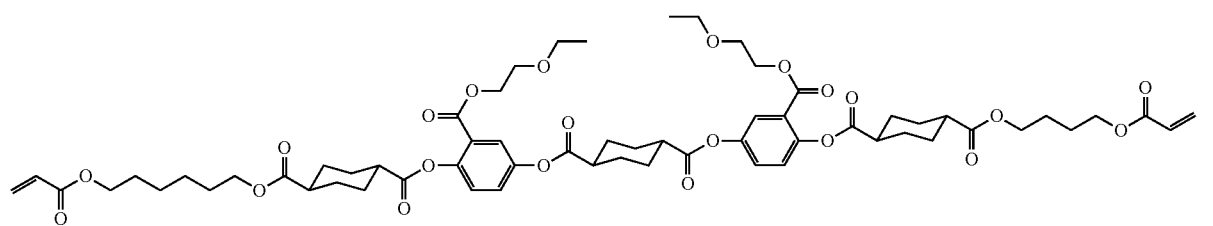

(16)

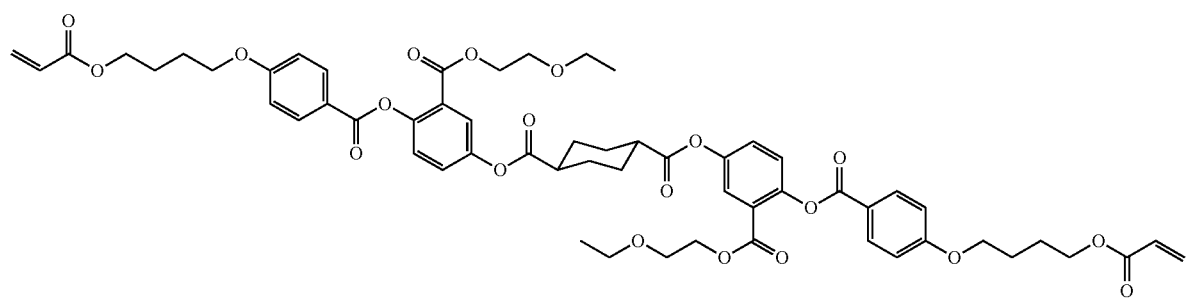

(17)

Examples of the polymerizable liquid crystal compound other than those exemplified above include cyclic organopolysiloxane compounds described in JP1982-165480A (JP-S57-165480A).

The ink may contain only one polymerizable liquid crystal compound or two or more polymerizable liquid crystal compounds.

In particular, it is preferable that the ink contain two or more different polymerizable liquid crystal compounds. In a case where two or more polymerizable liquid crystal compounds are used, color reproducibility can be further improved.

A content of the polymerizable liquid crystal compound is preferably 1% by mass to 70% by mass, more preferably 5% by mass to 60% by mass, and particularly preferably 15% by mass to 45% by mass with respect to the total amount of the ink.

(Chiral Compound)

The chiral compound is also referred to as an optically active compound. The chiral compound has a function of inducing the helical structure of the polymerizable liquid crystal compound. A twist direction or pitch of the induced helical structure varies with the type and content of the chiral compound.

As the chiral compound, known compounds can be used without particular limitations (for example, see Liquid Crystal Device Handbook, Chapter 3, Section 4-3, Chiral Agent for TN and STN, p. 199, edited by the 142nd Committee of Japan Society for the Promotion of Science, 1989), and examples thereof include isosorbide derivatives and isomannide derivatives.

The chiral compound generally includes an asymmetric carbon atom, but the chiral compound may not include the asymmetric carbon atom as long as the compound has chirality. Examples of the chiral compound include an axially chiral compound having a binaphthyl structure, a helically chiral compound having a helicene structure, and a planarly chiral compound having a cyclophane structure.

The chiral compound may have a polymerizable group. In a case where the chiral compound has a polymerizable group, a polymer having a structural unit derived from the polymerizable liquid crystal compound and a structural unit derived from the chiral compound is formed by a polymerization reaction between the chiral compound and the polymerizable liquid crystal compound. In a case where the chiral compound has a polymerizable group, the polymerizable group is preferably the same type of group as the polymerizable group included in the polymerizable liquid crystal compound. Therefore, the polymerizable group in the chiral compound is preferably a polymerizable unsaturated group, an epoxy group, or an aziridinyl group, more preferably a polymerizable unsaturated group, and particularly preferably an ethylenically unsaturated group. In addition, the chiral compound itself may be a liquid crystal compound.

Specific examples of the chiral compound include the following compounds. The chiral compound which can be used in the ink composition is not limited to the following examples. "Me" in the compound means a methyl group.

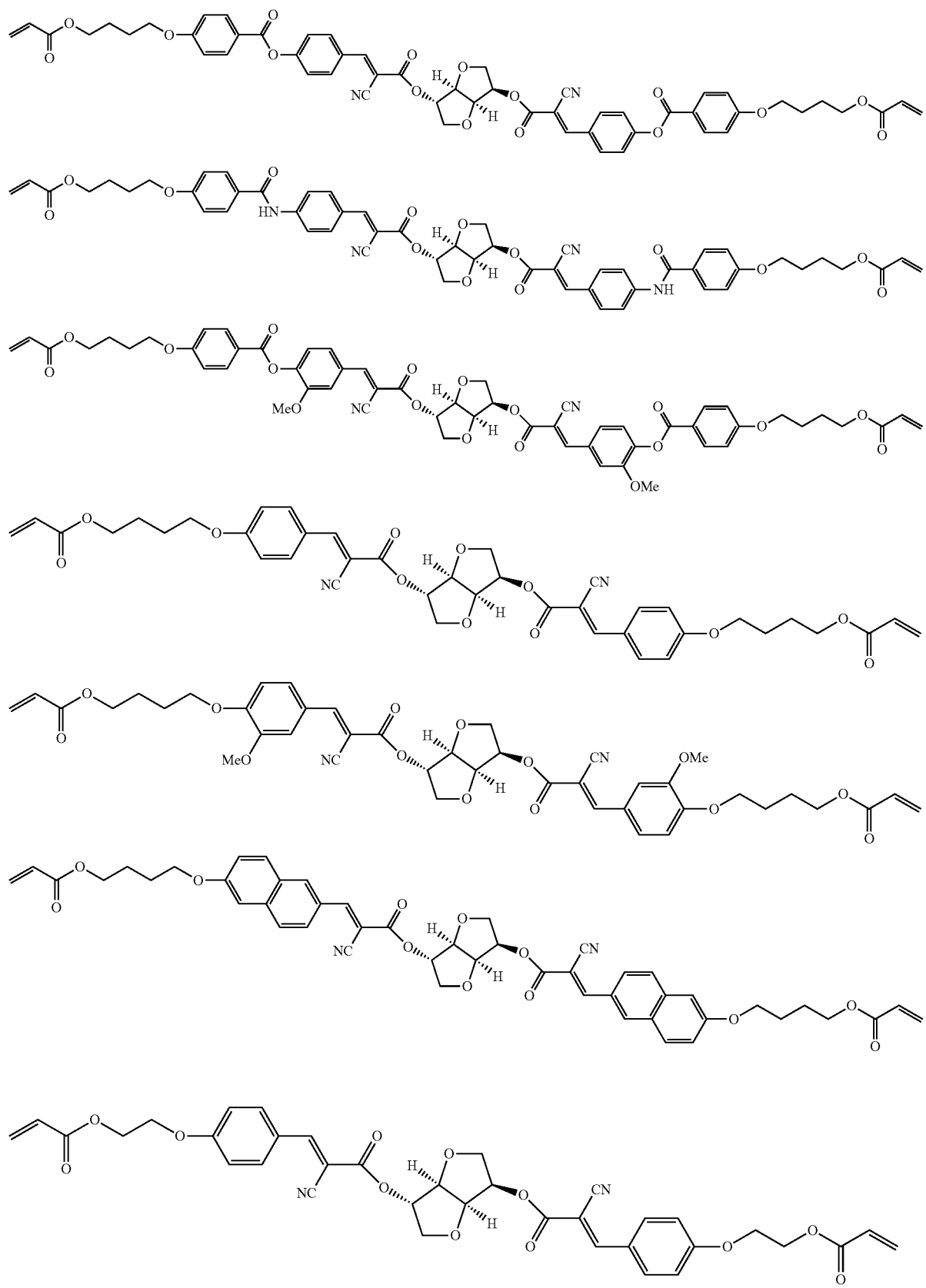

-continued
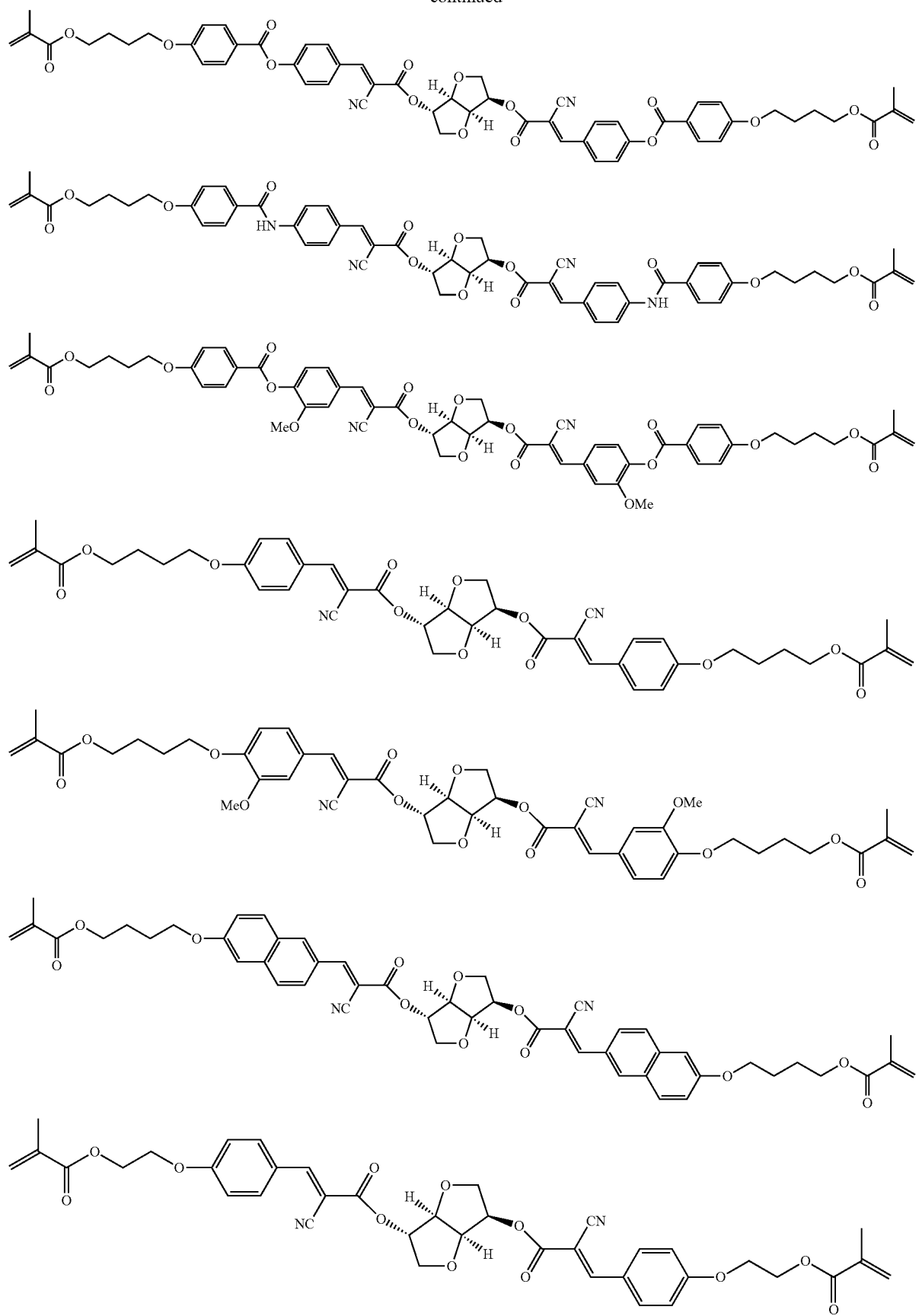

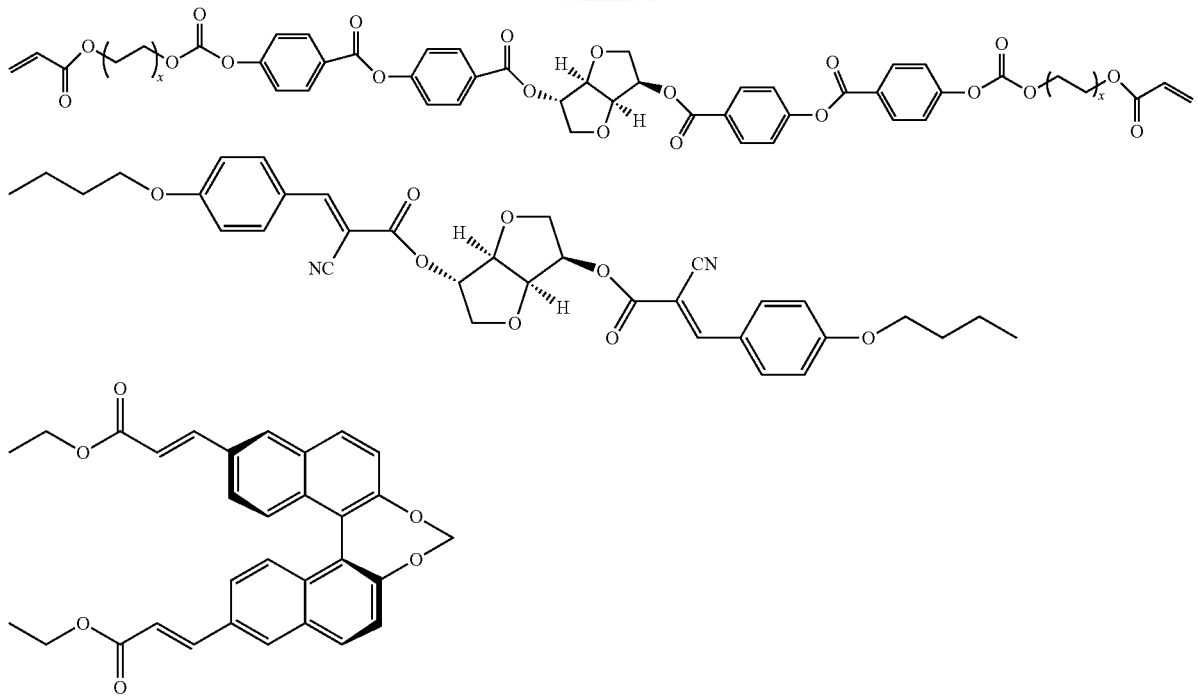

In the above compounds, X's each independently represent an integer of 2 to 5.

A content of the chiral compound is preferably 1 part by mass to 15 parts by mass and more preferably 1.5 parts by mass to 5 parts by mass with respect to 100 parts by mass of the content of the polymerizable liquid crystal compound in the ink composition.

(Solvent)

The type of the solvent is not particularly limited, and can be appropriately selected according to the purpose.

Examples of the solvent include a ketone-based solvent, an alkyl halide-based solvent, an amide-based solvent, a sulfoxide-based solvent, a heterocyclic compound, a hydrocarbon-based solvent, an ester-based solvent, and an ether-based solvent.

It is preferable that the solvent includes a solvent having a boiling point of 100° C. or higher and lower than 300° C. In a case of including a solvent having a boiling point of 100° C. or higher and lower than 300° C., jettability of the ink is improved.

The boiling point means a boiling point at 1 atmospheric pressure (101,325 Pa). The boiling point is measured by a boiling point meter, and is measured using, for example, a boiling point measuring device (product name "DosaTherm 300") manufactured by TITAN TECHNOLOGIES, K.K.

Examples of the solvent having a boiling point of 100° C. or higher and lower than 300° C. include:

polyhydric alcohols such as ethylene glycol (boiling point: 198° C.), propylene glycol (boiling point: 188° C.). 1,2-butanediol (boiling point: 194° C. is 2,3-butanediol (boiling point: 183° C.), 2-methyl-1,3-propanediol (boiling point: 124° C.), 2-methyl-2,4-pentanediol (boiling point: 198° C.), 1,2,6-hexanetriol (boiling point: 178° C.), 1,2,3-butanetriol (boiling point: 175° C.), 1,2,4-butanediol (boiling point: 170° C.), diethylene glycol (boiling point: 244° C.), dipropylene glycol (boiling point: 231° C.), 1,3-propanediol (boiling point: 214° C.), 1,3-butanediol (boiling point: 208° C.), 1,4-butanediol (boiling point: 230° C.), 1,2-pentanediol (boiling point: 206° C.), 2,4-pentanediol (boiling point: 201° C.), 2-methyl-1,3-butanediol (boiling point: 203° C.), 3-methyl-1,3-butanediol (boiling point: 203° C.), 1,5-pentanediol (boiling point: 242° C.), 2,2-dimethyl-1,3-propanediol (boiling point: 208° C.), 1,2-hexanediol (boiling point: 223° C.), 1,6-hexanediol (boiling point: 250° C.), 2,5-hexanediol (boiling point: 217° C.), 2-ethyl-1,3-hexanediol (boiling point: 243° C.), triethylene glycol (boiling point: 287° C.), tripropylene glycol (boiling point: 273° C.), and glycerin (boiling point: 290° C.);

polyhydric alcohol alkyl ethers such as ethylene glycol monomethyl ether (boiling point: 124° C.), ethylene glycol monoethyl ether (boiling point: 135° C.), ethylene glycol-n-propyl ether (boiling point: 150° C.), ethylene glycol monobutyl ether (boiling point: 171° C.), propylene glycol monomethyl ether (boiling point: 120° C.), propylene glycol monoethyl ether (boiling point: 133° C.), propylene glycol-n-butyl ether (boiling point: 171° C.), propylene glycol-t-butyl ether (boiling point: 153° C.), tetraethylene glycol monomethyl ether (boiling point: 159° C.), diethylene glycol methyl ether (boiling point: 194° C.), diethylene glycol diethyl ether (boiling point: 162° C.), diethylene glycol-n-butyl ether (boiling point: 230° C.), dipropylene glycol monomethyl ether (boiling point: 188° C.), diethylene glycol monoethyl ether (boiling point: 202° C.), diethylene glycol monobutyl ether (boiling point: 230° C.), triethylene glycol methyl ether (boiling point: 249° C.), dipropylene glycol-n-propyl ether (boiling point: 213° C.), tripropylene glycol methyl ether (boiling point: 243° C.), triethylene glycol ethyl ether (boiling point: 256° C.), diethylene glycol-n-hexyl ether (boiling point: 259° C.), tripropylene glycol-n-propyl ether (boiling point: 261° C.), and 3-methoxybutanol (boiling point: 161° C.);

polyhydric alcohol aryl ethers such as ethylene glycol phenyl ether (boiling point: 237° C.), propylene glycol phenyl ether (boiling point: 243° C.), and ethylene glycol monobenzyl ether (boiling point: 256° C.);

nitrogen-containing compounds such as F-caprolactam (boiling point: 137° C.), N-methylformamide (boiling point: 199° C.), N,N-dimethylformamide (boiling point: 153° C.), N-methyl-2-pyrrolidone (boiling point: 204° C.), 2-pyrrolidone (boiling point: 245° C.), 1,3-dimethylimidazolidinone (boiling point: 220° C.), and N-methylpyrrolidinone (boiling point: 202° C.);

ester compounds such as propylene glycol monomethyl ether acetate (boiling point: 146° C.) and 3-methoxybutyl acetate (boiling point: 172° C.); and ketone compounds such as diacetone alcohol (boiling point: 169° C.) and γ-butyrolactone (boiling point: 204° C.).

A content of the solvent is preferably 20% by mass to 90% by mass, more preferably 40% by mass to 80% by mass, and still more preferably 50% by mass to 80% by mass with respect to the total amount of the ink.

(Polymerization Initiator)

It is preferable that the ink further contains a polymerization initiator. The polymerization initiator is preferably a photopolymerization initiator, and more preferably a radical polymerization initiator having a function of generating radicals by irradiation with ultraviolet rays.

Examples of the polymerization initiator include an alkylphenone-based photopolymerization initiator, an acylphosphine oxide-based photopolymerization initiator, an intramolecular hydrogen withdrawing-type photopolymerization initiator, an oxime ester-based photopolymerization initiator, and a cationic photopolymerization initiator. Among these, as the polymerization initiator, an acylphosphine oxide-based photopolymerization initiator is preferable, and specifically, (2,4,6-trimethylbenzoyl)diphenylphosphine oxide or bis(2,4,6-trimethylbenzoyl) phenylphosphine oxide is preferable.

A content of the polymerization initiator is preferably 0.1 parts by mass to 20 parts by mass and more preferably 0.5 parts by mass to 12 parts by mass with respect to 100 parts by mass of the polymerizable liquid crystal compound.

(Additive)

As long as the effect of the present disclosure is not impaired, the ink can contain an additive as necessary.

Examples of the additive include a surfactant, a cross-linking agent, and a non-polymerizable polymer for improving jettability of the ink.

In a case where the ink contains a surfactant, the polymerizable liquid crystal compounds are horizontally aligned on an air interface side in the cured ink, and the directions of the helical axes are more uniformly controlled. The surfactant is preferably a compound which can function as an alignment control agent stably or rapidly establishing a cholesteric structure with planar alignment. Examples of the surfactant include a silicone-based surfactant and a fluorine-based surfactant, and a fluorine-based surfactant is preferable.

A content of the surfactant is preferably 0.01 parts by mass to 10 parts by mass, more preferably 0.01 parts by mass to 5 parts by mass, and still more preferably 0.01 parts by mass to 1 part by mass with respect to 100 parts by mass of the polymerizable liquid crystal compound.

(Physical Properties)

A viscosity of the ink is preferably 7 mPa·s or more, more preferably 8 mPa·s or more, and still more preferably 10 mPa·s or more. From the viewpoint of jettability of the ink, the upper limit value of the viscosity of the ink is, for example, 30 mPa·s.

The viscosity of the ink is measured at 25° C. using a viscometer, and for example, a viscometer (product name "RE-85L", manufactured by TOKISANGYO) is used.

A surface tension of the ink is preferably 20 mN/m to 40 mN/m and more preferably 23 mN/m to 35 mN/m.

The surface tension of the ink is measured at 25° C. using a surface tensiometer, and for example, a surface tensiometer (product name "DY-700", manufactured by Kyowa Interface Science Co., Ltd.) is used.

(Ink Jet Recording Method)

As the ink jet recording method, a generally known method can be used, and examples thereof include an electric charge control method of jetting the ink composition by using an electrostatic attraction force; a drop-on-demand method (pressure pulse method) of using a vibration pressure of a piezo element; an acoustic ink jet method of converting an electric signal into an acoustic beam, irradiating the ink composition, and jetting the ink composition using a radiation pressure; and a thermal ink jet method of heating the ink composition to form air bubbles and utilizing the generated pressure.

In general, an image recording method by an ink jet recording device includes a shuttle scan method (also referred to as a "serial head method") of recording images using a short serial head, and a single-pass method (also referred to as a "line head method") that image recording is performed using a line head in which recording elements are arranged corresponding to the entire width direction of the recording medium. In the shuttle scan method, images are recorded while scanning the serial head in the width direction of the recording medium. On the other hand, in the single-pass method, images can be recorded on the entire surface of the recording medium by scanning the recording medium in the direction orthogonal to the arrangement direction of the recording elements. Therefore, different from the shuttle scan method, the single-pass method does not require a transport system of scanning the serial head, such as a carriage. In addition, in the single-pass method, movement of the carriage and complicated scanning control with the recording medium are not required, and only the recording medium moves, so that the recording speed can be increased as compared with the shuttle scan method.

In the image recording method according to the present disclosure, it is preferable to use a shuttle scan method. The film thickness of the image can be increased by applying the ink a plurality of times at the same position. In addition, in a case where the shuttle scan method is used, coalescence of ink droplets is suppressed, so that the stereoscopic effect is enhanced.

(Ink Application Conditions)

In the ink applying step, the ink is applied under a condition that a difference of film thicknesses of the image to be recorded within a range of a length of width of 40 mm in an in-plane direction of the substrate is 0.5 μm or more.

The film thickness of the recorded image can be controlled by, for example, an amount of jetted liquid droplets, a printing rate, and the like. Therefore, examples of a method of setting the difference of film thicknesses of the recorded image to be 0.5 μm or more include a method of changing the amount of jetted liquid droplets, the printing rate, and the like by the application position of the ink on the substrate.

Figure 4C:
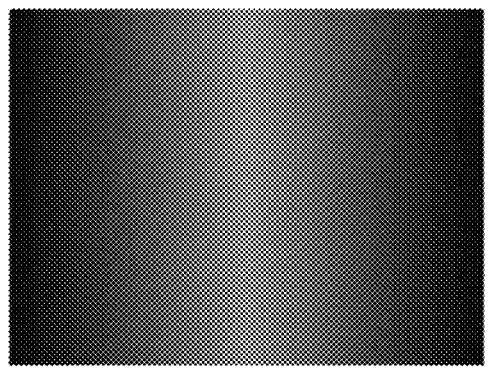
FIG. 4C is an example of image data in which a printing rate is continuously changed with a portion having a low printing rate as a center.

Specific examples thereof include the following methods.

a) a method in which the amount of jetted liquid droplets is decreased in a portion where the film thickness is to be reduced, and the amount of jetted liquid droplets is increased in a portion where the film thickness is to be increased b) a method in which the printing rate is decreased in a portion where the film thickness is to be reduced, and the printing rate is increased in a portion where the film thickness is to be increased c) a method in which a) and b) are combined in any manner FIGS. 4A to 4C show specific examples of image data in which the printing rate is changed. FIG. 4A is an example of image data in which the printing rate is continuously changed with a portion having a high printing rate as a center. FIG. 4B is an example of image data in which solid images having different printing rates are arranged adjacent to each other. FIG. 4C is an example of image data in which a printing rate is continuously changed with a portion having a low printing rate as a center.

For example, by using the image data shown in FIGS. 4A to 4C, it is possible to record an image in which the difference of film thicknesses within a range of a length of width of 40 mm in the in-plane direction of the substrate is 0.5 μm or more.

In a case where the image data shown in FIG. 4A is used, an image recorded material in which the film thickness is thickest at the center portion and the film thickness is gradually decreased from the center portion toward two opposing sides is obtained. The image recorded material 40 shown in FIG. 3A is an example of an image recorded material obtained in a case where the image data shown in FIG. 4A is used.

In a case where the image data shown in FIG. 4B is used, a portion where the film thickness continuously changes is present in the center portion. The image recorded material 50 shown in FIG. 3B is an example of an image recorded material obtained in a case where the image data shown in FIG. 4B is used.

In a case where the image data shown in FIG. 4C is used, an image recorded material in which the film thickness is thinnest at the center portion and the film thickness is gradually increased from the center portion toward two opposing sides is obtained.

From the viewpoint of further exhibiting the stereoscopic effect, it is preferable to apply the ink under the condition that the difference of film thicknesses of the image to be recorded within a range of a length of width of 40 mm in the in-plane direction of the substrate is 0.5 μm or more. The upper limit value of the difference of film thicknesses of the image to be recorded is not particularly limited, but is, for example, 30 μm. In addition, it is preferable that the ink is applied under a condition that the difference of film thicknesses of the image to be recorded within a range of a length of width of 10 mm in the in-plane direction of the substrate is 1 μm to 30 μm.

<Active Energy Ray Irradiating Step>

In the active energy ray irradiating step, the ink applied onto the substrate is irradiated with active energy ray to record an image, which is a cured film of the ink.

Examples of the active energy ray in the active energy ray irradiating step include ultraviolet rays, visible light, and an electron beam. Among these, ultraviolet rays (hereinafter, also referred to as "UV") are preferable as the active energy ray.

A peak wavelength of the ultraviolet rays is preferably 100 nm to 405 nm and more preferably 200 nm to 395 nm.

The exposure amount of ultraviolet rays is preferably 20 mJ/cm$^2$ to 5 J/cm$^2$ and more preferably 100 mJ/cm$^2$ to 1,500 mJ/cm$^2$. As irradiation conditions and basic irradiation method, irradiation conditions and irradiation method described in JP1985-132767A (JP-S60-132767A) can be adopted. Specifically, the irradiation method is preferably a method of providing a light source on both sides of a head unit including an ink jet device and scanning the substrate by the head unit and the light source by a so-called shuttle method, or a method of irradiating the substrate with another light source that is not involved in driving. Among these, it is preferable to uniformly irradiate the entire image recording surface with ultraviolet rays.

As a light source for ultraviolet irradiation, a mercury lamp, a gas laser, and a solid-state laser are mainly used, and a mercury lamp, a metal halide lamp, and an ultraviolet fluorescent lamp are widely known. In addition, a light emitting diode (UV-LED) and a laser diode (UV-LD) are compact, long-life, highly efficient, and low-cost, and are expected to be used as the light source for ultraviolet irradiation. Among these, a metal halide lamp, a high-pressure mercury lamp, a medium-pressure mercury lamp, a low-pressure mercury lamp, or UV-LED is preferable as the light source for the ultraviolet irradiation.

(Substrate Heating Step)

It is preferable that the image recording method according to the present disclosure further includes a step of heating the substrate (hereinafter, referred to as "substrate heating step"). After the substrate heating step, in the ink applying step, it is preferable to apply the ink onto the heated substrate.

In a case where the substrate is heated in advance, in the cross section of the image along the thickness direction, a region having a larger absolute value of the alignment angle can be formed, and the stereoscopic effect of the image recorded material is more exhibited.

In the substrate heating step, an unit for heating the substrate is not particularly limited, and examples thereof include a heat drum, hot air, an infrared lamp, an oven, a heat plate, and a hot plate. A heating temperature of the substrate is preferably 40° C. or higher, more preferably 40° C. to 100° C., and still more preferably 45° C. to 80° C.

(Ink Heating Step)

It is preferable that the image recording method according to the present disclosure includes, after the ink applying step and before the active energy ray irradiating step, a step of heating the ink applied onto the substrate (hereinafter, referred to as "ink heating step").

In the ink heating step, a content of the solvent in the ink after the heating is preferably 50% by mass or less and more preferably 10% by mass or less with respect to a content of the solvent immediately before a timing of applying the ink. By setting the content of the solvent in the ink before the active energy ray irradiating step to be 50% by mass or less, the liquid crystal compound contained in the ink is quickly aligned. In the cross section of the image along the thickness direction, a region having a larger absolute value of the alignment angle can be formed, and the stereoscopic effect of the image recorded material is more exhibited. The lower limit value of the content of the solvent in the ink after the heating with respect to the content of the solvent immediately before a timing of applying the ink is not particularly limited, but is, for example, 0% by mass.

(Layer Configuration)

In the image recording method according to the present disclosure, after the image including the cholesteric liquid crystal layer is recorded by applying the above-described ink onto the substrate, other image including no cholesteric liquid crystal layer may be recorded. The other images may be a specific pattern, character, or the like, or may be a solid image. According to this aspect, an image recorded material in which an image including the cholesteric liquid crystal layer and other image including no cholesteric liquid crystal layer are arranged on the substrate in this order is obtained. In particular, in a case where the substrate is a transparent substrate and the image recorded material is observed from a side opposite to the image recording surface of the substrate, the stereoscopic effect is remarkable.

In addition, in the image recording method according to the present disclosure, the image including the cholesteric liquid crystal layer may be recorded by applying the above-described ink, after other image including no cholesteric liquid crystal layer is recorded on the substrate. According to this aspect, an image recorded material in which other image including no cholesteric liquid crystal layer and the image including the cholesteric liquid crystal layer are arranged on the substrate in this order is obtained. In a case where the image recorded material is observed from a side of the image recording surface of the substrate, the stereoscopic effect is obtained depending on a viewing angle.

In the above-described aspects, it is preferable to record the image including the cholesteric liquid crystal layer by applying the above-described ink onto the substrate, perform a hydrophilic treatment, and then record other image. In addition, it is preferable to record other image on the substrate, perform a hydrophilic treatment, and then record the image including the cholesteric liquid crystal layer by applying the above-described ink. By performing the hydrophilic treatment, graininess of the image recorded later is suppressed.

Examples of the other images including no cholesteric liquid crystal layer include a color image and a clear image. The color image is recorded by applying, for example, ink containing a coloring material. The clear image is recorded by applying, for example, an ink not containing a coloring material. The ink for recording the other images is preferably an active energy ray curable-type ink, and it is preferable to perform irradiation with active energy ray after applying the ink. The method of applying the ink is not particularly limited, but it is preferable to apply the ink using an ink jet recording method.

In a case where a processing treatment such as potting processing and resin bonding processing is performed after recording the image, the graininess of the image is suppressed, and the stereoscopic effect is improved. In a case of being bonded to a transparent resin, it is preferable to use a transparent pressure sensitive adhesive.

In a case of the resin bonding processing, the stereoscopic effect can be obtained from either the front or the back by bonding two or more kinds of transparent resins.

The image recorded material can also be used by being bonded to a wall, glass, a plastic panel, a building material, a display, a decoration for a car, a light, a molded article, or the like.

EXAMPLES

Hereinafter, the present disclosure will be described in more detail using Examples. However, the present disclosure is not limited to the following examples as long as it does not exceed the gist of the present invention.

Example 1

[Preparation of Ink]

(Ink Rm1)
Components shown below were mixed to prepare an ink Rm1.
A viscosity of the ink Rm1 (25° C.) was 11 mPa · s.

| | |
|---|---|
| Diethylene glycol diethyl ether | 62.38 parts by mass |
| Mixture A1 of polymerizable liquid crystal compounds | 34 parts by mass |
| Polymerization initiator: bis(2,4,6-trimethylbenzoyl)phenylphosphine oxide (product name "Omnirad 819") | 2 parts by mass |
| Chiral compound A | 1.6 parts by mass |
| Fluorine-based surfactant (product name "FTERGENT 208G", manufactured by NEOS COMPANY LIMITED) | 0.02 parts by mass |

The mixture of the polymerizable liquid crystal compounds was obtained by mixing compounds at the following proportion.

Mixture A1 of polymerizable liquid crystal compounds: 50% by mass of a compound (10) and 50% by mass of a compound (11)

The compounds (10) and (11) are rod-like liquid crystal compounds. Structures of the compound (10), the compound (11), and the chiral compound A are as follows.
(Compound (10) and Compound (11))

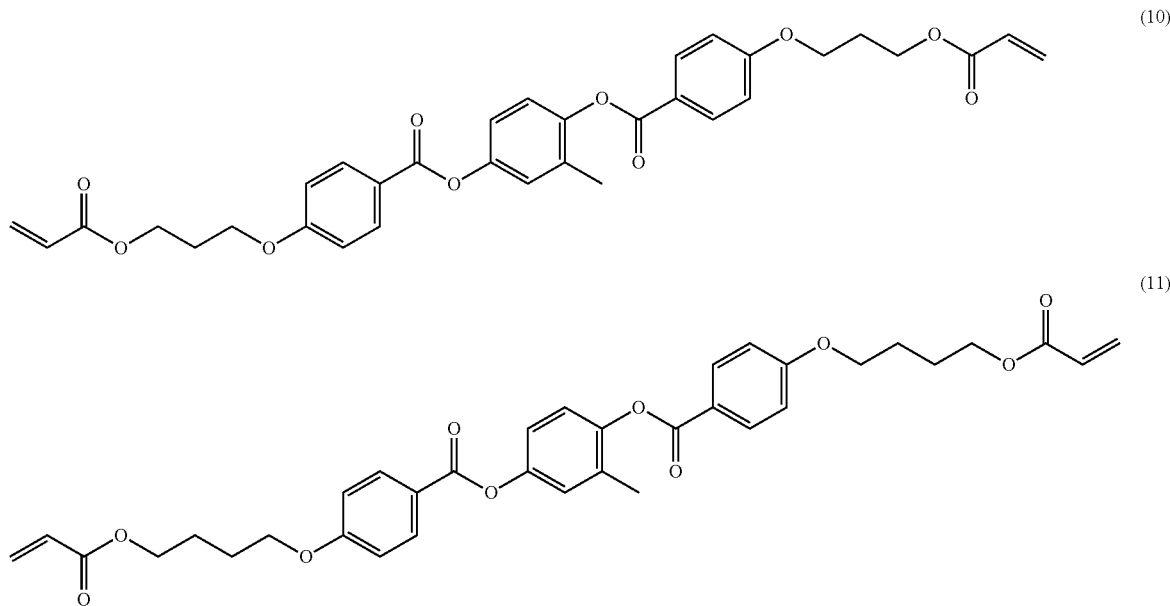

(Chiral Compound A)

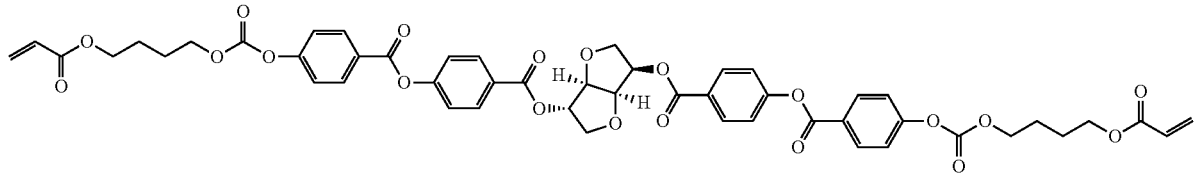 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

In a case where reflectivity of an ink film formed of the ink Rm1 in the visible light region was measured, the ink Rm1 was an ink for forming an ink film having a selective reflection wavelength of 640 nm.

The selective reflection wavelength of the ink film was calculated by the following method.

The ink was applied onto a PET substrate heated to 50° C. under a condition of a halftone dot rate of 100%, and further dried at 80° C. for 5 minutes. Next, the ink was cured using a metal halide lamp (product name "CSOT-40, manufactured by GS Yuasa International Ltd.) to obtain an ink film. The selective reflection wavelength was calculated by measuring a spectral reflectance of the ink film using a fluorescence spectral densitometer (product name "FD-7", manufactured by Konica Minolta, Inc.). In the measurement, a black paper of a covering ratio measurement paper (standard: JIS K 5600, manufactured by TP Giken Co., Ltd.) was placed under the substrate, and the color was measured by setting the ink film on the outermost layer.

[Image Recording]

Image data as shown in FIG. 4A was created in which the printing rate was continuously changed with a part having a high printing rate at the center in a width of 10 mm and a length of 5 mm. FIG. 4A is a schematic view, and the scale is appropriately changed in Example 1.

A PET sheet (product name "Viewful UV TP-188", manufactured by KIMOTO) was used as a substrate. The substrate was placed on a hot plate produced by bonding a rubber heater to a metal plate, and heated such that the temperature of the substrate reached 70° C. The ink Rm1 was jetted onto the substrate heated to 70° C. using an ink jet printer (product name "UJF3042HG", manufactured by MIMAKI ENGINEERING CO., LTD.). Specifically, the image recording was performed with the created image data by setting the image resolution to 600 dpi×720 dpi and the number of passes to 32.

After the image recording, the substrate was further heated at 80° C. for 5 minutes, and then exposed using a metal halide lamp mounted on an ultraviolet irradiation device (product name "CSOT-40", manufactured by GS Yuasa International Ltd.) such that the integrated exposure amount of ultraviolet A (UVA) was 500 mJ/cm$^2$, thereby obtaining an image recorded material.

In the obtained image recorded material, the maximum value of the film thickness was 2.5 μm and the minimum value of the film thickness was 1.7 μm, and the film thickness was continuously changed from a portion having a high density to a portion having a low density of the image data.

Example 2

An image recorded material was obtained by the same method as in Example 1, except that the change amount of the printing rate in the image data was changed.

In the obtained image recorded material, the maximum value of the film thickness was 2.5 μm and the minimum value of the film thickness was 1.4 μm, and the film thickness was continuously changed from a portion having a high density to a portion having a low density of the image data.

Example 3

An image recorded material was obtained by the same method as in Example 1, except that the change amount of the printing rate in the image data was changed.

In the obtained image recorded material, the maximum value of the film thickness was 2.5 μm and the minimum value of the film thickness was 1.1 μm, and the film thickness was continuously changed from a portion having a high density to a portion having a low density of the image data.

Example 4

An image recorded material was obtained by the same method as in Example 3, except that the width of the image in the image data was changed to 20 mm.

Example 5

An image recorded material was obtained by the same method as in Example 3, except that the width of the image in the image data was changed to 40 mm.

Example 6

An image recorded material was obtained by the same method as in Example 3, except that the width of the image in the image data was changed to 6 mm.

Example 7

An image recorded material was obtained by the same method as in Example 3, except that, in Example 3, the application amount of the ink was changed.

Comparative Example 1

Solid image data having a width of 10 mm and a length of 5 mm was created. An image recorded material was obtained by the same method as in Example 1, except that the image data was changed.

Comparative Example 2

An image recorded material was obtained by the same method as in Example 3, except that the width of the image in the image data was changed to 80 mm.

Example 8

Image data shown in FIG. 4B was created by arranging a solid image B having a width of 10 mm and a length of 10 mm and a solid image C having a width of 10 mm and a length of 10 mm and having a lower printing rate than the solid image B, adjacent to each other. An image recorded material was obtained by the same method as in Example 1, except that the image data was changed.

In the obtained image recorded material, the maximum value of the film thickness was 2.5 μm and the minimum value of the film thickness was 2.0 μm.

Example 9

An image recorded material was obtained by the same method as in Example 8, except that the printing rate of the image C in the image data was changed.

In the obtained image recorded material, the maximum value of the film thickness was 2.5 μm and the minimum value of the film thickness was 1.75 μm.

Example 10

An image recorded material was obtained by the same method as in Example 8, except that the printing rate of the image C in the image data was changed.

In the obtained image recorded material, the maximum value of the film thickness was 2.5 μm and the minimum value of the film thickness was 1.1 μm.

Example 11

[Preparation of Ink]

| (Ink Gm1) Components shown below were completely mixed to prepare an ink Gm1. A viscosity of the ink Gm1 (25° C.) was 11 mPa · s. | |
|---|---|
| Diethylene glycol diethyl ether | 62.28 parts by mass |
| Mixture A1 of polymerizable liquid crystal compounds | 34 parts by mass |
| Polymerization initiator: bis(2,4,6-trimethylbenzoyl)phenylphosphine oxide (product name "Omnirad 819") | 1.8 parts by mass |
| Chiral compound A | 1.9 parts by mass |
| Fluorine-based surfactant (product name "FTERGENT 208G", manufactured by NEOS COMPANY LIMITED) | 0.02 parts by mass |

In a case where reflectivity of an ink film formed of the ink Gm1 in the visible light region was measured, the ink Gm1 was an ink for forming an ink film having a selective reflection wavelength of 550 nm.

[Image Recording]

An image recorded material was obtained by the same method as in Example 10, except that the type of the ink was changed to the ink Gm1.

Example 12

[Preparation of Ink]

| (Ink Bm1) Components shown below were completely mixed to prepare an ink Bm1. A viscosity of the ink Bm1 (25° C.) was 11 mPa · s. | |
|---|---|
| Diethylene glycol diethyl ether | 62.08 parts by mass |
| Mixture A1 of polymerizable liquid crystal compounds | 34 parts by mass |
| Polymerization initiator: bis(2,4,6-trimethylbenzoyl)phenylphosphine oxide (product name "Omnirad 819") | 1.7 parts by mass |
| Chiral compound A | 2.2 parts by mass |
| Fluorine-based surfactant (product name "FTERGENT 208G", manufactured by NEOS COMPANY LIMITED) | 0.02 parts by mass |

In a case where reflectivity of an ink film formed of the ink Bm1 in the visible light region was measured, the ink Bm1 was an ink for forming an ink film having a selective reflection wavelength of 440 nm.

[Image Recording]

An image recorded material was obtained by the same method as in Example 10, except that the type of the ink was changed to the ink Bm1.

Example 13

The printing was performed once using the image data of the solid image C, in which the printing setting was changed such that the application amount of the ink was doubled. Thereafter, an image recorded material was obtained by the same method as in Example 8, except that the image recording surface was subjected to a hydrophilic treatment using a corona surface modification evaluation device (product name "TEC-4AX", manufactured by KASUGA DENKI, INC.), and then the printing was performed again by superimposing the image C using the image data.

In the obtained image recorded material, the maximum value of the film thickness was 10.0 μm and the minimum value of the film thickness was 2.0 μm.

Example 14

The printing was performed once using the image data of the solid image C, in which the printing setting was changed such that the application amount of the ink was doubled. Thereafter, the image recording surface was subjected to a hydrophilic treatment using a corona surface modification evaluation device (product name "TEC-4AX", manufactured by KASUGA DENKI, INC.), and the printing was performed by superimposing the image C using the image data. Furthermore, an image recorded material was obtained by the same method as in Example 8, except that the image recording surface was subjected to the same hydrophilic treatment as described above, and then the printing was performed by superimposing the image C using the image data.

In the obtained image recorded material, the maximum value of the film thickness was 18.0 μm and the minimum value of the film thickness was 8.0 μm.

Example 15

Image data was created by arranging a solid image B having a width of 10 mm and a length of 10 mm and a solid image D having a width of 10 mm and a length of 10 mm, adjacent to each other.

In the solid image B, the printing rate of the ink Rm1 was set to 100%, and in the solid image C, the printing rate of the ink Rm1 was set to 40% and the printing rate of the ink Bm1 was set to 60%.

The temperature of the substrate was set to 70° C., and the ink Rm1 and the ink Bm1 were jetted from each head to perform the image recording with the created image data.

In the obtained image recorded material, the film thickness was 3.0 μm.

Example 16

Image data shown in FIG. 4B was created by arranging a solid image E having a width of 10 mm and a length of 10 mm and a solid image F having a width of 10 mm and a length of 10 mm, adjacent to each other.

In the solid image E, the printing rate of the ink Rm1 was set to 100% and the printing rate of the ink Bm1 was set to 50%, and in the solid image F, the printing rate of the ink Rm1 was set to 50% and the printing rate of the ink Bm1 was set to 50%.

The temperature of the substrate was set to 70° C., and the ink Rm1 and the ink Bm1 were jetted from each head to perform the image recording with the created image data.

In the obtained image recorded material, the film thickness of the solid image E was 4.5 μm, and the film thickness of the solid image F was 3.0 μm.

Example 17

Image data shown in FIG. 4B was created by arranging a solid image G having a width of 10 mm and a length of 10 mm and a solid image H having a width of 10 mm and a length of 10 mm, adjacent to each other.

In the solid image G, the printing rate of the ink Rm1 was 100%, the printing rate of the ink Bm1 was set to 25%, and the printing rate of the ink Gm1 was set to 25%, and in the solid image H, the printing rate of the ink Rm1 was set to 50%, the printing rate of the ink Bm1 was set to 25%, and the printing rate of the ink Gm1 was set to 25%.

The temperature of the substrate was set to 70° C., and the ink Rm1, the ink Bm1, and the ink Gm1 were jetted from each head to perform the image recording with the created image data.

In the obtained image recorded material, the film thickness of the solid image G was 4.5 μm, and the film thickness of the solid image H was 3.0 μm.

Example 18

Image data shown in FIG. 4B was created by arranging a solid image I having a width of 10 mm and a length of 10 mm and a solid image J having a width of 10 mm and a length of 10 mm, adjacent to each other.

In the solid image I, the printing rate of the ink Rm1 was set to 100% and the printing rate of the ink Gm1 was set to 100%, and in the solid image J, the printing rate of the ink Rm1 was set to 50% and the printing rate of the ink Gm1 was set to 50%.

The temperature of the substrate was set to 70° C., and the ink Rm1 and the ink Gm1 were jetted from each head to perform the image recording with the created image data.

In the obtained image recorded material, the film thickness of the solid image I was 6.0 m, and the film thickness of the solid image J was 3.0 km.

Example 19

[Preparation of Ink]
(Ink Rm2)

In the ink Rm1, 1 part by mass of FLORSTAB UV12 (manufactured by Kromachem Ltd.) was mixed instead of 1 part by mass of the diethylene glycol diethyl ether, thereby preparing an ink Rm2. A viscosity of the ink Rm2 (25° C.) was 11 mPa·s. Using the ink Rm2, the application amount of the ink was adjusted only on the apparatus under the same image data and printing conditions as in Example 3.

In the obtained image recorded material, the maximum value of the film thickness was 3.0 μm and the minimum value of the film thickness was 1.3 μm, and the film thickness was continuously changed from a portion having a high density to a portion having a low density of the image data.

In a case where reflectivity of an ink film formed of the ink Rm2 in the visible light region was measured, the ink Rm2 was an ink for forming an ink film having a selective reflection wavelength of 640 nm.

Example 20

[Preparation of Ink]
(Ink Rm3)

An ink Rm3 was prepared by the same method as in the ink Rm1, except that the chiral compound A was changed to 1.4 parts by mass, FLORSTAB UV12 (manufactured by Kromachem Ltd.) was changed to 1 part by mass, and diethylene glycol diethyl ether was changed to 61.58 parts by mass. A viscosity of the ink Rm3 (25° C.) was 11 mPa·s. An image recorded material was obtained by the same method as in Example 19, except that the ink Rm3 was used.

In a case where reflectivity of an ink film formed of the ink Rm3 in the visible light region was measured, the ink Rm3 was an ink for forming an ink film having a selective reflection wavelength of 700 nm.

Example 21

An image recorded material was obtained by the same method as in Example 1, except that the change amount of the printing rate in the image data was changed.

In the obtained image recorded material, the maximum value of the film thickness was 7.0 μm and the minimum value of the film thickness was 3.0 μm, and the film thickness was continuously changed from a portion having a high density to a portion having a low density of the image data.

Comparative Example 3

An image recorded material was obtained in the same manner as in Example 8, except that the printing rate of the image C in the image data was changed.

Comparative Example 4

The ink was applied onto the entire surface of the substrate such that the film thickness was 2.5 μm, and then dried at 95° C. for 60 seconds. The temperature was lowered from 95° C. to 25° C. at a rate of −7° C./s, and then the substrate was exposed to light at 25° C. to obtain an image recorded material.

(Analysis of Image)

The image recorded material obtained in Examples and Comparative Examples was cut along a thickness direction to produce a cross-sectional sample. Using a scanning electron microscope (acceleration voltage: 2 kV, observation magnification: 5,000 times and 10,000 times), a cross-sectional SEM image was observed, and the presence or absence of a stripe pattern of a bright portion and a dark portion was confirmed. As a result, the stripe pattern was confirmed in Examples 1 to 21 and Comparative Examples 1 to 4.

In addition, the cross section of the image recorded material was analyzed, and two regions in which the absolute value of the difference of the alignment angles was 5° or more and the length of width was 1 mm or more were specified. In addition, among combinations of two regions in which the absolute value of the difference of the alignment angles was 5° or more, regions with the smallest distance of the two regions were referred to as a region 1 and a region 2, respectively. The alignment angles of the region 1 and the region 2, and the lengths of width of the region 1 and the region 2 are shown in Tables 1 and 2. In Comparative Examples 1 to 4 of Tables 1 and 2, since there were no two regions in which the absolute value of the difference of the alignment angles was 5° or more and the length of width was 1 mm or more, columns related to the region 1 and the region 2 are indicated by "-".

In Examples 1 to 7 and Examples 19 to 21, the alignment angles of the region 1 and the region 2 were measured by the same method as in the image recorded material 40 shown in FIG. 3A. In Examples 1 to 7 and 19 to 21, the alignment angle was measured with the region (full-width region) corresponding from the imaginary orthogonal line 439 to the imaginary orthogonal line 431 shown in FIG. 3A in focus.

In Examples 8 to 14 and Examples 16 to 18, the alignment angles of the region 1 and the region 2 were measured by the same method as in the image recorded material 50 shown in FIG. 3B. In Examples 8 to 18, the alignment angle was measured with the region corresponding from the imaginary orthogonal line 531 to the imaginary orthogonal line 536 shown in FIG. 3B in focus.

In Example 15, the alignment angle was measured with the imaginary orthogonal lines 431 to 439 shown in FIG. 3A in a direction orthogonal to the image recorded material with a width of 20 mm (combined length of 10 mm of a width of the solid image B and 10 mm of a width of the solid image D).

In addition, using the obtained image recorded material, an evaluation regarding the stereoscopic effect was performed. The evaluation method was as follows. The evaluation results are shown in Tables 1 and 2.

(Stereoscopic Effect)

The image recorded material was horizontally placed on a black portion of a paper for a covering ratio measurement, and the image recorded material was observed in a normal direction and a direction of 60° from the normal direction. Specifically, color developability was changed by changing the observation direction to confirm whether or not the shadow was visible, and the degree of the shadow was determined. In a case where the color developability was changed to be visible as a shadow, it can be said that there is a stereoscopic effect.

A: shadow was dark, and the width of the shadow was large.
B: shadow was visible, and the width of the shadow was large.
C: shadow was visible.
D: shadow could be slightly visible.
E: there was no stereoscopic effect.

TABLE 1

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Selective reflection wavelength (nm) | 640 | 640 | 640 | 640 | 640 | 640 | 640 | 640 | 640 |
| Maximum value of film thickness (μm) | 2.5 | 2.5 | 2.5 | 2.5 | 2.5 | 2.5 | 6.0 | 2.5 | 2.5 |
| Minimum value of film thickness (μm) | 1.7 | 1.4 | 1.1 | 1.1 | 1.1 | 1.1 | 2.6 | 2.5 | 1.1 |
| Difference of film thicknesses within range of length of width of 40 mm (μm) | 0.8 | 1.1 | 1.4 | 1.4 | 1.4 | 1.4 | 3.4 | 0 | 0.4 |
| Difference of film thicknesses within range of length of width of 10 mm (μm) | 0.8 | 1.1 | 1.4 | 0.7 | 0.4 | 1.4 | 3.4 | 0 | 0.1 |
| Alignment angle in region 1 (°) | −8 to −5 | −10 to −7 | −17 to −10 | −10 to −7 | −7 to −3 | −17 to −10 | −20 to −10 | — | — |
| Alignment angle in region 2 (°) | 5 to 8 | 7 to 10 | 10 to 17 | 7 to 10 | 3 to 7 | 10 to 17 | 10 to 20 | — | — |
| Width of region 1 (mm) | 4 | 4.8 | 4.8 | 9.5 | 19 | 2.8 | 4.8 | — | — |
| Width of region 2 (mm) | 4 | 4.8 | 4.8 | 9.5 | 19 | 2.8 | 4.8 | — | — |
| Distance between region 1 and region 2 (mm) | 1 | 0.4 | 0.4 | 1 | 1 | 0.4 | 0.4 | — | — |
| Substrate temperature | 70 | 70 | 70 | 70 | 70 | 70 | 70 | 70 | 70 |
| Stereoscopic effect | C | B | A | A | D | A | A | E | E |

TABLE 2

| | Example 8 | Example 9 | Example 10 | Example 11 | Example 12 | Example 13 | Example 14 | Comparative Example 3 | Comparative Example 4 |
|---|---|---|---|---|---|---|---|---|---|
| Selective reflection wavelength of ink (nm) | 640 | 640 | 640 | 550 | 440 | 640 | 640 | 640 | 640 |
| Maximum value of film thickness (μm) | 2.5 | 2.5 | 2.5 | 2.5 | 2.5 | 10.0 | 18.0 | 2.5 | 2.5 |
| Minimum value of film thickness (μm) | 2.0 | 1.75 | 1.1 | 1.1 | 1.1 | 2.0 | 8.0 | 2.3 | 2.5 |
| Difference of film thicknesses within range of length of width of 40 mm (μm) | 0.5 | 0.75 | 1.4 | 1.4 | 1.4 | 8.0 | 10.0 | 0.2 | 0 |
| Difference of film thicknesses within range of length of width of 10 mm (μm) | 0.5 | 0.75 | 1.4 | 1.4 | 1.4 | 8.0 | 10.0 | 0.2 | 0 |
| Alignment angle in region 1 (°) | −2 to 2 | −2 to 2 | −2 to 2 | −2 to 2 | −2 to 2 | −2 to 2 | −2 to 2 | — | — |
| Alignment angle in region 2 (°) | −10 to −7 | −13 to −8 | −15 to −10 | −15 to −10 | −15 to −10 | −15 to −10 | −15 to −10 | — | — |
| Width of region 1 (mm) | 9 | 8 | 7 | 7 | 7 | 7 | 9 | — | — |
| Width of region 2 (mm) | 2 | 3 | 3 | 3 | 3 | 4 | 5 | — | — |
| Distance between region 1 and region 2 (mm) | 0.2 | 0.2 | 0.2 | 0.2 | 0.2 | 0.2 | 0.2 | — | — |
| Substrate temperature | 70 | 70 | 70 | 70 | 70 | 70 | 70 | 70 | 95→25 |
| Stereoscopic effect | C | B | A | A | B | A | A | E | E |

TABLE 3

| | Example 15 | Example 16 | Example 17 | Example 18 | Example 19 | Example 20 | Example 21 |
|---|---|---|---|---|---|---|---|
| Selective reflection wavelength of ink (nm) | 640, 440 | 640, 440 | 640, 440, 550 | 640, 550 | 640 | 700 | 640 |
| Maximum value of film thickness (μm) | 3.0 | 4.5 | 4.5 | 6.0 | 3.0 | 3.0 | 7.0 |
| Minimum value of film thickness (μm) | 3.0 | 3.0 | 3.0 | 3.0 | 1.3 | 1.3 | 3.0 |
| Difference of film thicknesses within range of length of width of 40 mm (μm) | 0 | 1.5 | 1.5 | 3.0 | 1.7 | 1.7 | 4.0 |
| Difference of film thicknesses within range of length of width of 10 mm (μm) | 0 | 1.5 | 1.5 | 3.0 | 1.7 | 1.7 | 4.0 |
| Alignment angle in region 1 (°) | −2 to 2 | −2 to 2 | −2 to 2 | −2 to 2 | −17 to −10 | −17 to −10 | −20 to −10 |
| Alignment angle in region 2 (°) | 10 to 15 | 10 to 15 | 10 to 15 | 10 to 15 | 10 to 17 | 10 to 17 | 10 to 20 |
| Width of region 1 (mm) | 7 | 7 | 7 | 7 | 4.8 | 4.8 | 4.8 |
| Width of region 2 (mm) | 3 | 3 | 3 | 3 | 4.8 | 4.8 | 4.8 |
| Distance between region 1 and region 2 (mm) | 0.2 | 0.2 | 0.2 | 0.2 | 0.4 | 0.4 | 0.4 |
| Substrate temperature | 70 | 70 | 70 | 70 | 70 | 70 | 70 |
| Stereoscopic effect | A | A | A | A | A | A | A |

As shown in Tables 1 to 3, in Examples 1 to 21, since the image recorded material included a substrate and an image recorded on the substrate, in which the image included a cholesteric liquid crystal layer, the cholesteric liquid crystal layer had a stripe pattern of a bright portion and a dark portion, observed by a scanning electron microscope, in a cross section along a thickness direction of the image, in a case where an angle between a continuous line which was the bright portion or the dark portion and a main surface of the substrate was defined as an alignment angle, at least two regions in which an absolute value of a difference of the alignment angles was 5° or more were provided, and both of the two regions had a length of width of 1 mm or more in an in-plane direction of the substrate, the stereoscopic effect of the image recorded material was obtained.

On the other hand, in Comparative Examples 1 to 4, there were no two regions in which the absolute value of the difference of the alignment angles was 5° or more, and the stereoscopic effect of the image recorded material could not be obtained.

Example 101

An image was recorded on the substrate by the same method as in Example 10, and then a black 100% solid image was recorded thereon using an ink jet printer (product name "Acuity LED 1600II", manufactured by FUJIFILM Corporation).

Example 102

An image was recorded on the substrate by the same method as in Example 10, and then a white 100% solid image was recorded thereon using an ink jet printer (product name "Acuity LED 1600II", manufactured by FUJIFILM Corporation).

Example 103

An image was recorded on a substrate by the same method as in Example 10, and then the image and a transparent sheet made of polyvinyl chloride were bonded to each other.

Example 104

An image was recorded on a substrate by the same method as in Example 10, and then the image and glass were bonded to each other.

In Example 101 and Example 102, in a case where the substrate was observed from a side opposite to the image recording surface, the stereoscopic effect was confirmed.

In Example 103 and Example 104, in a case of observing from the image recording surface of the substrate and from a side opposite to the image recording surface of the substrate, the stereoscopic effect was confirmed on both surfaces.

The disclosure of JP2021-185021 filed on Nov. 12, 2021 and the disclosure of JP2022-091690 filed on Jun. 6, 2022 are incorporated in the present specification by reference. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. An image recorded material comprising:
a substrate; and
an image recorded on the substrate,
wherein the image includes a cholesteric liquid crystal layer,
wherein the cholesteric liquid crystal layer has a stripe pattern of a bright portion and a dark portion, observed by a scanning electron microscope, in a cross-section along a thickness direction of the image,
wherein, in a case in which an angle between a continuous line, which is the bright portion or the dark portion, and a main surface of the substrate is defined as an alignment angle, at least two regions in which an absolute value of a difference of alignment angles is 5° or more are provided, and
wherein each of the at least two regions has a length of width of 1 mm or more in an in-plane direction of the substrate.

2. The image recorded material according to claim 1, wherein the alignment angle is from −5° to 5° in at least a part of the cholesteric liquid crystal layer.

3. The image recorded material according to claim 1, wherein at least one region of the at least two regions has a length of width of from 1 mm to 40 mm in the in-plane direction of the substrate.

4. The image recorded material according to claim 1, wherein the image includes a region in which a difference of film thicknesses within a range of a length of width of 40 mm in the in-plane direction of the substrate is 0.5 μm or more.

5. The image recorded material according to claim 1, wherein the image includes a region in which a difference of film thicknesses within a range of a length of width of 10 mm in the in-plane direction of the substrate is from 1 μm to 30 μm.

6. The image recorded material according to claim 1, wherein the image has a selective reflection wavelength of 460 nm or more.

7. The image recorded material according to claim 1, wherein another image including no cholesteric liquid crystal layer is further disposed between the substrate and the image or on the image on the substrate.

* * * * *